United States Patent [19]

Cairns

[11] Patent Number: 4,801,935

[45] Date of Patent: Jan. 31, 1989

[54] APPARATUS AND METHOD FOR SECURITY OF ELECTRIC AND ELECTRONIC DEVICES

[75] Inventor: John P. Cairns, Wilmington, Del.

[73] Assignee: Computer Security Corporation, St. Georges, Del.

[21] Appl. No.: 188,137

[22] Filed: Apr. 26, 1988

Related U.S. Application Data

[63] Continuation of Ser. No. 931,616, Nov. 17, 1986, abandoned, which is a continuation-in-part of Ser. No. 602,471, Apr. 20, 1984, abandoned.

[51] Int. Cl.[4] .............................................. H04R 1/00
[52] U.S. Cl. ........................... 340/825.34; 340/825.31; 379/62
[58] Field of Search .................. 361/172; 70/278; 307/10 AT; 340/825.3–825.35; 380/3, 4; 379/62; 364/709, 200, 900

[56] References Cited

U.S. PATENT DOCUMENTS

| | | | |
|---|---|---|---|
| 3,321,673 | 5/1967 | Wolfe | 361/172 |
| 3,609,690 | 9/1971 | Nissmann et al. | 340/825.34 |
| 3,740,330 | 6/1973 | Hoffer et al. | 235/380 |
| 3,831,065 | 8/1974 | Martin et al. | 361/172 |
| 4,012,982 | 3/1977 | Southard | 84/1.01 |
| 4,103,289 | 7/1978 | Kolber . | |
| 4,139,864 | 2/1979 | Schulman | 364/709 X |
| 4,262,337 | 4/1981 | Jones . | |
| 4,267,578 | 5/1981 | Vetter . | |
| 4,428,024 | 6/1984 | Mochida et al. | 340/825.31 X |
| 4,430,728 | 2/1984 | Beitel et al. | 340/825.34 X |
| 4,494,114 | 1/1985 | Kaish | 340/571 X |

*Primary Examiner*—Ulysses Weldon
*Attorney, Agent, or Firm*—Connolly & Hutz

[57] ABSTRACT

An apparatus and method having elements and steps selected and arranged to require a timed, coded input for authenticating a code of characters in a set sequence for authorizing user access and having means for emitting a signal or alarm, wherein the system is initialized so as to require matching of representative signals at inhibiting control circuits having an on-state and an off-state so that characters entered sequentially in timed cycles are authenticated as a correct member of a code set in a correct time cycle or disqualified as an unauthentic character.

An authentic character is a certain designated character entered in the selected time cycle.

5 Claims, 15 Drawing Sheets

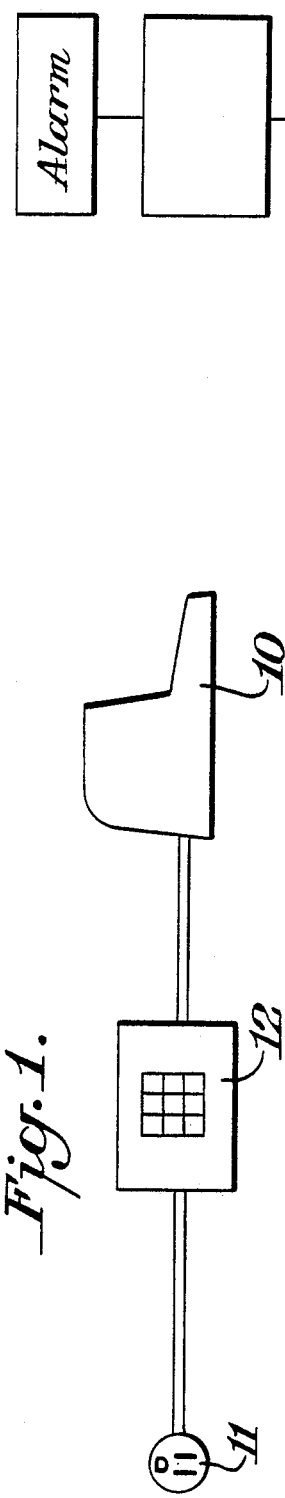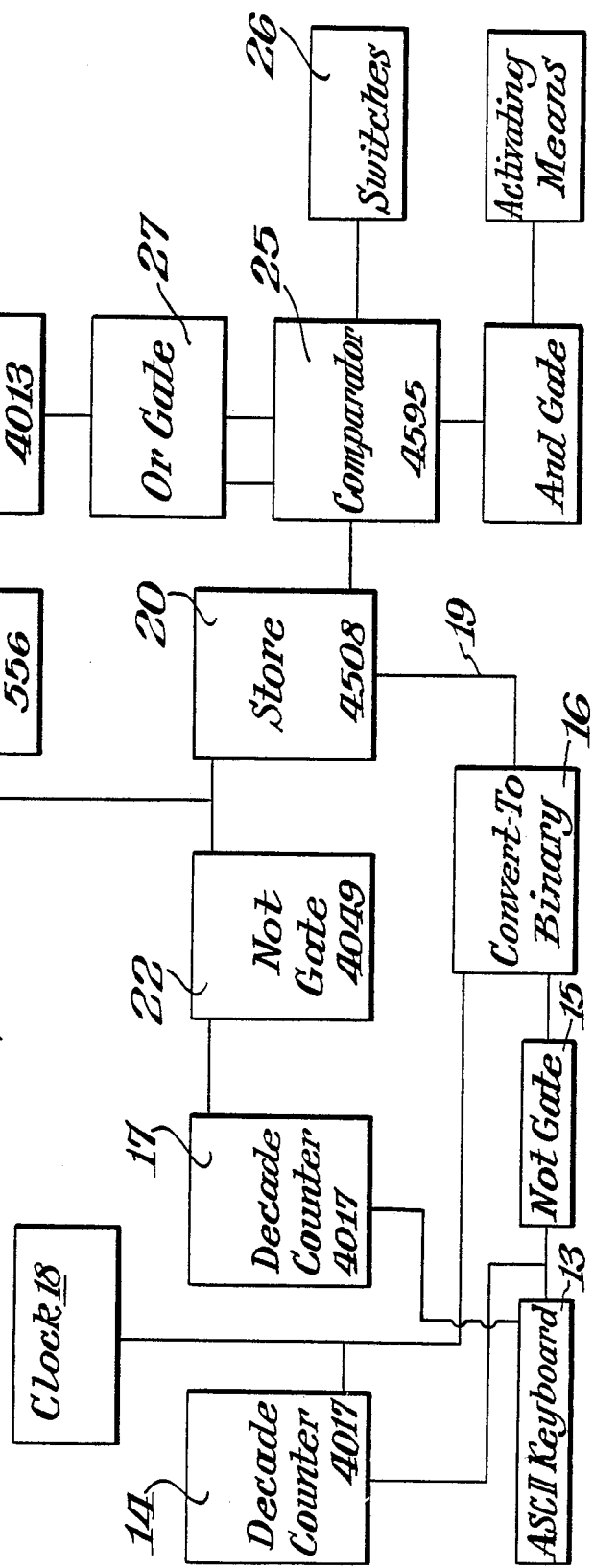

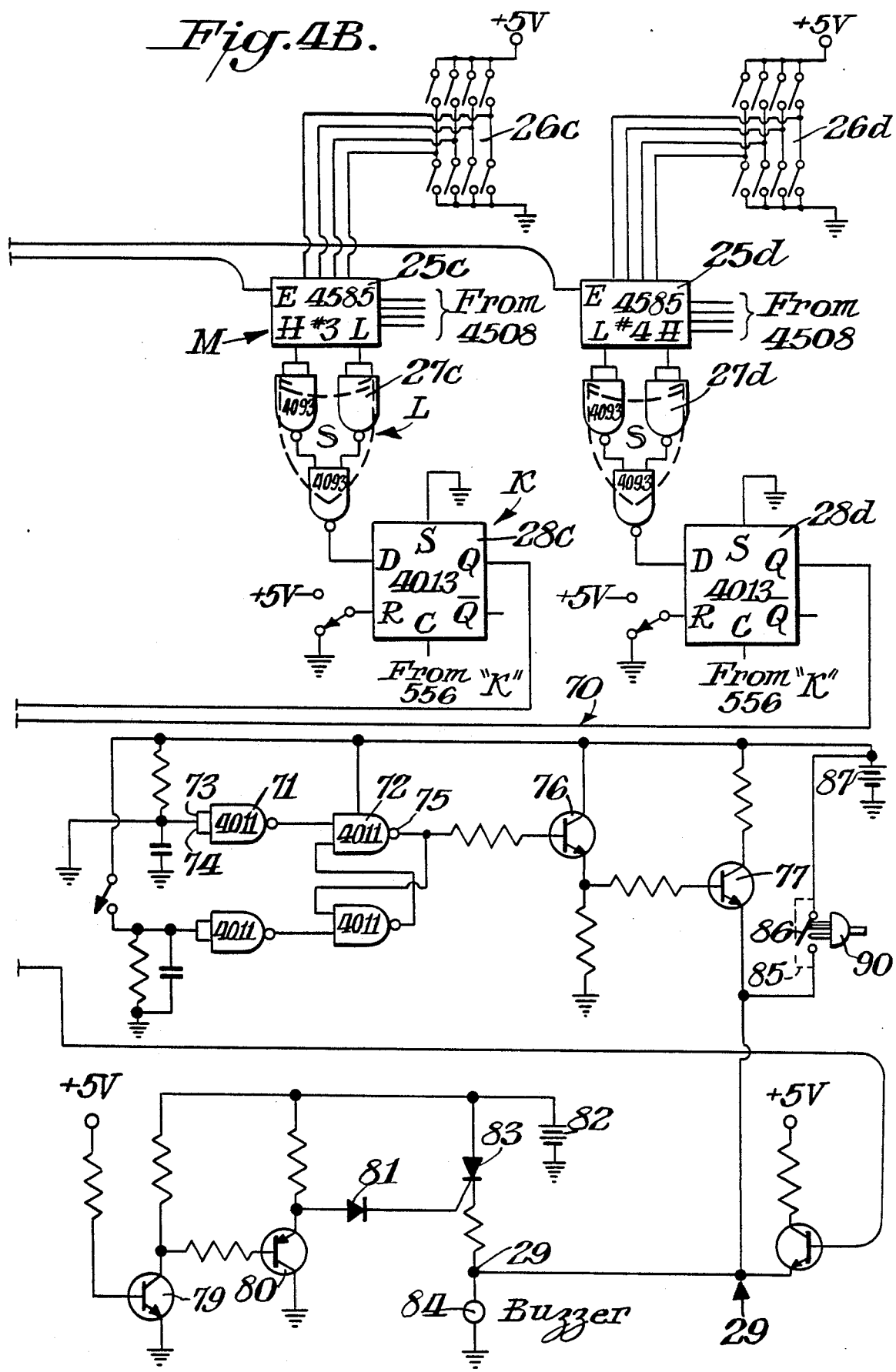

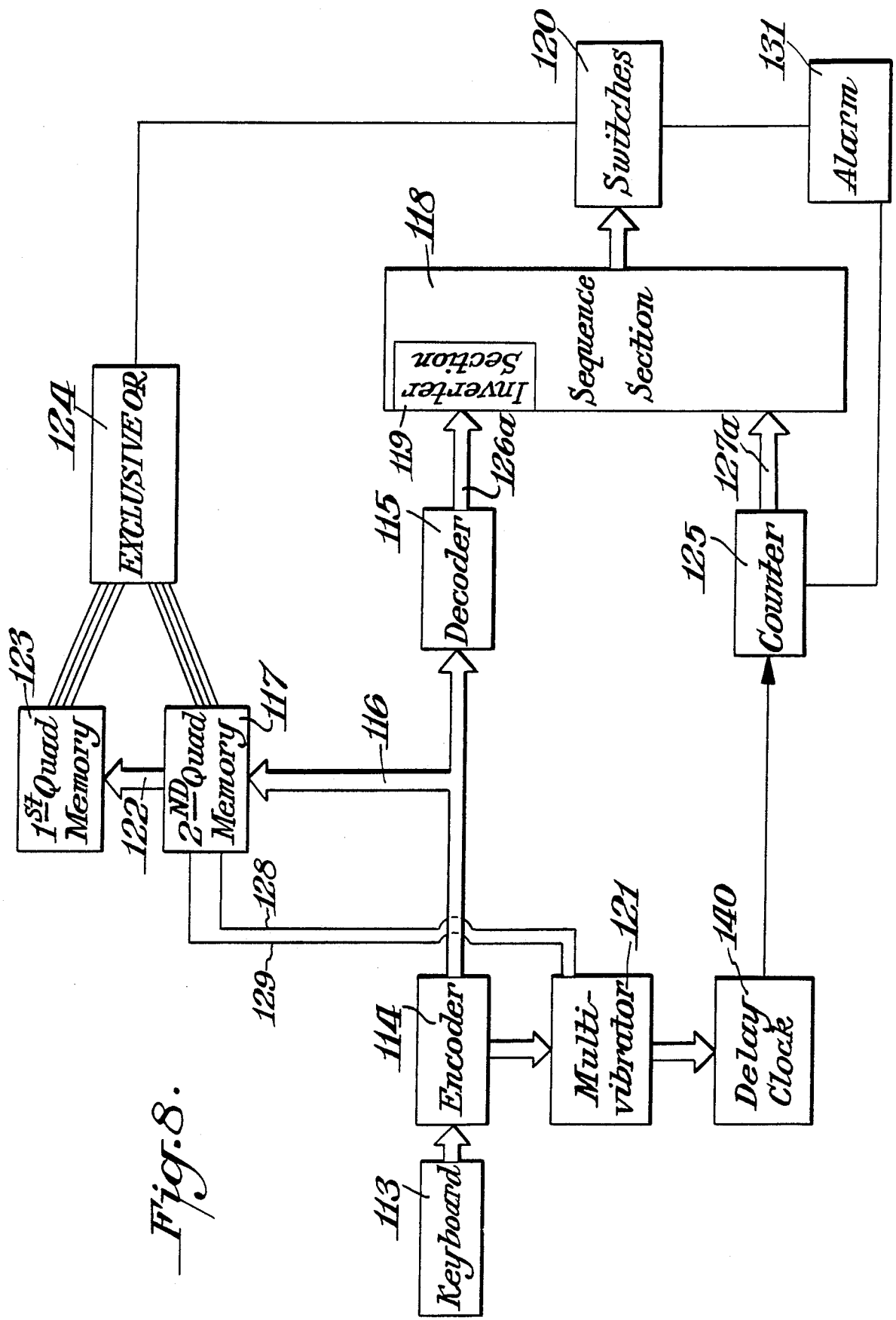

Start

Under Clock Pulse Hi

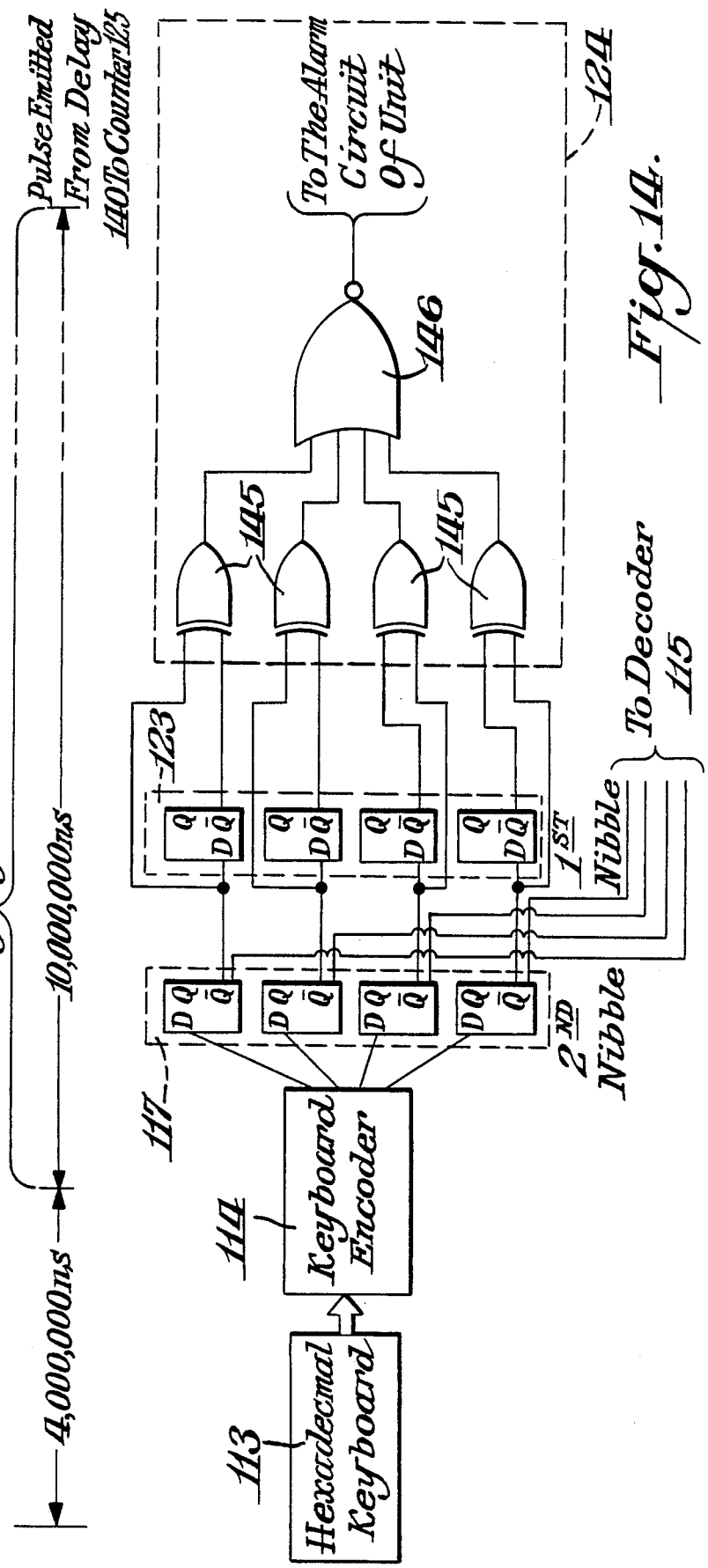

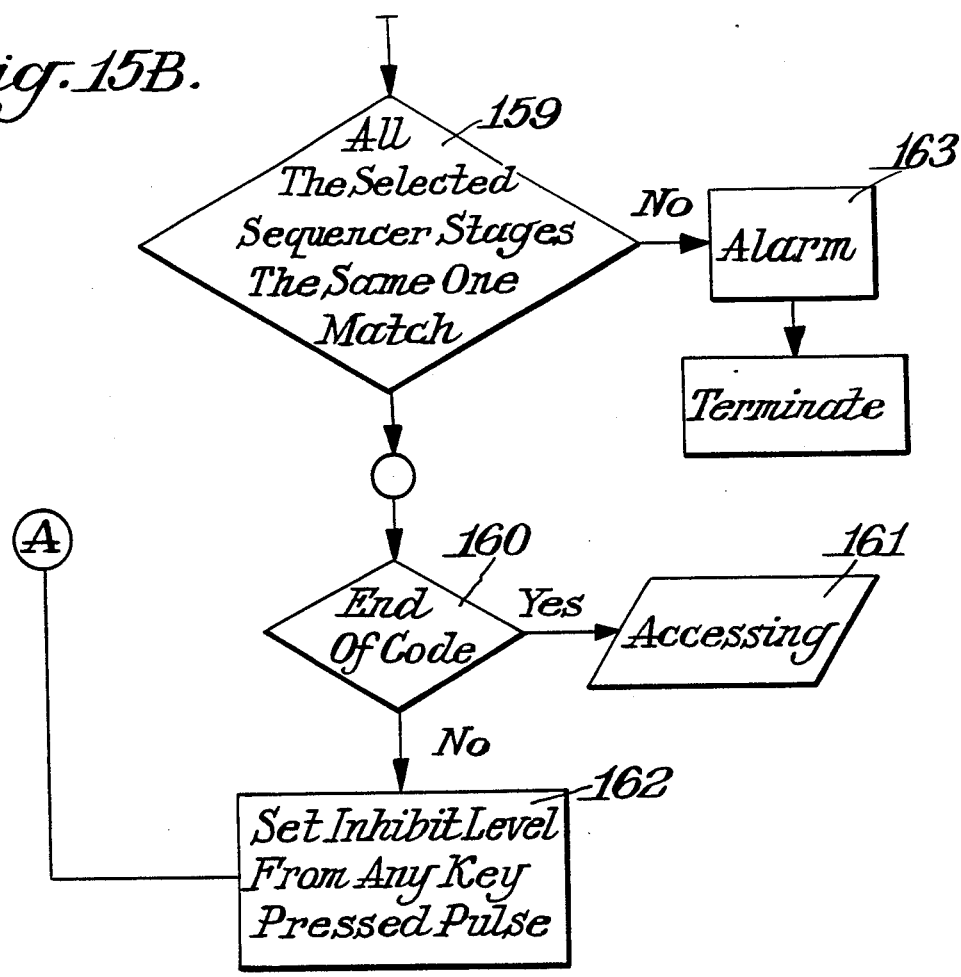

APPARATUS AND METHOD FOR SECURITY OF ELECTRIC AND ELECTRONIC DEVICES

CROSS REFERENCE TO RELATED APPLICATION

This application is a continuation of application Ser. No. 931,616, filed Nov. 17, 1986, now abandoned, which application is a continuation-in-part of the copending U.S. application Ser. No. 602,471, filed Apr. 20, 1984 for Apparatus and Method for Security of Electric and Electronic Devices, now abandoned.

BACKGROUND OF THE INVENTION

The present invention relates to the verification of a control of the operation of an electrically powered apparatus.

The invention further relates to means for protective control of the operation of apparatus.

This invention also pertains to access control which is accomplished by the user establishing authority for access by use of a code of characters.

Still further, this invention relates to a verification operation of the actuation of the control means by selected data and the detection of incorrect actuating data and the protection against unauthorized operation of apparatus.

Computer systems involve a large number of apparatuses at separated locations linked together and to a central pipeline. These electric and electronic devices are operated by signals transmitted through the system between locations which are physically remote from each other. The use of the system is intended to be restricted to those authorized to do so. A problem encountered in the operation of these computers and these systems is unauthorized use of the computers and particularly use with intent to steal or commit fraud. Attempts have been made to prevent this unauthorized use by employing scrambling equipment and to provide secret codes. This can be inadequate because the codes can be broken.

Security systems have been devised for preventing unauthorized access by remote control of electrical and electronic operations. The means previously provided to secure computer systems against unauthorized and improper operation have been evaded.

An object of this invention is the limiting of access by a user by access control.

It is an object of this invention to provide apparatus and method for establishing authority for the access of a user to apparatus by verifying the authenticity of an electrical or electronic signal for actuating the operation of a system.

Another object of the invention is to provide a device which can be set to respond to specific data and can actuate means for connecting apparatus to a power source.

It is a further object of this invention to provide a machine having means for emitting an actuating signal and element selected and arranged so as to require a coded input for authorization of the actuation.

Among the objects of the invention are provisions of a method and apparatus for inserting alphanumerics or hexadecimals into a system and utilizing this coded information for the purpose of actuation of a system.

SUMMARY OF THE INVENTION

After start-up and initializing of the apparatus, a set code of integers, as for example converted to hexadecimal characters, is introduced into the apparatus, one character at a time.

The characters of the code are sequentially entered in a predetermined order in timed cycles of character entry. The number of cycles is determined by the total number of characters entered in the set code. The timing of the cycles is related to the time when information is entered at a keyboard. In one embodiment the characters are of the hexadecimal number system. The sequential entries at the keyboard lead to the transmittal of the hexadecimal characters individually to a decoder which translates each coded character to a selected output position of the decoder such as by a transfer of an output position pin from high to low. The selection of the various output positions in the decoder for the respective entered code characters is affected by the logic of the internal connections of the decoder. The output position pins are connected to a related individual inhibiting control circuit. The transfer of an output pin from high to low produces the output of a positive pulse which is transmitted to the respective inhibiting control circuit. The information bits provided by the entered characters of the decoding from BCD's to position in the decoder are applied as pulses from the decoder.

The inhibiting control circuits which receive the information are switchable between two states. In one state the circuit will transmit a positive pulse received from the decoder, the on state. The transmittal of the positive pulse by the control circuit in the on state causes a switching within the circuit, called toggling, which results in the production of a positive pulse out from the control circuit. Thus in this state the information serves to produce an output pulse from the inhibiting coded circuit.

In the off state the circuit will not transmit the positive pulse. Thus in the off-state the information from the keyboard does not produce an output from the inhibiting control circuit.

The control circuits are individually connected to receive selectively from the output of a decade counter inhibiting pulses which place the circuits in an off state or non-transmitting state. Information entered at the keyboard is stored in a delay and transmitted to a decade counter in a phase of each cycle after the translation of the respective code character which is related to the stored information. The inhibiting pulses are successively emitted from the decade counter and in the successive timed cycles, one for each cycle, in accordance with step-by-step incrementing of the counter in one step for each cycle starting from the initializing of the apparatus. This occurs prior to the transmission of a positive pulse from the decoder to the control circuits. Thus, with the initialization of the insertion of the code and with each successive entry of the sequenced characters at the keyboard, the counter transmits an inhibiting pulse to a control circuit, and then is incremented in preparation for the issuance of the next pulse.

When the positive pulse from the decoder output pin is transmitted to an inhibiting control circuit in the off state, no switching occurs and the entered character is accordingly accepted.

Thus in every cycle there is a time of decision to accept or reject the characters entered at the keyboard. The state at the time of decision of the inhibiting control circuit in the sequencer on receiving successively entered characters determines the acceptance or rejection of the character.

FURTHER SUMMARY OF THE INVENTION IN MODIFICATION

In a modification, the apparatus and method may be used of the actuation of control means by selected data transmitted in signals in which the detection of incorrect data protects against the improper operation of a system. The control means controls the operation of electronic or electric devices. The subject apparatus includes a means for signaling the actuation of the operation of the electronic or electric device when data inserted into the subject apparatus for effecting the actuation equals predetermined coded information stored in the apparatus. The control is thus affected.

A pseudo comparator is a logic element that is not specifically designed for the comparison of two BCD's but can be made to perform as it were.

A virtual memory is a logic element that is not specifically designed to contain or hold bits but can ,be made to perform as if it were.

The invention uses a plurality of digital pseudo comparators each of which receives reference alphanumeric coded information and input both in binary digit, or bit, form. The alphanumeric reference information are virtually stored data in each of the respective pseudo-comparators. The combination of this information represents the correct code for signaling the actuation of the operation of the controlled device. The alphanumeric inputs are fed to the comparators from states which convert these characters into a string of 1's or zeros called a binary coded decimal. When the binary coded decimals are equal the pseudo comparators issue pulses which place a logical one on one input and an "and" gate. When the pseudo comparators calculate their respective binary coded decimals are equal the inputs to the "and" gate are all logical ones, then all the inputs of the "and" gate are turned on and a positive output is transmitted to effect actuation of the operation of the electronic or electric device.

When any pseudo comparator calculates the input is not equal to the reference binary coded decimal, an output to an "or" gate generates a pulse from the "or" gate which signals the incorrect data and immediately utters the fact to suitable means for prohibiting actuation of the control means.

In one means for actuation of the operation the electronic or electric device a means for transmitting power to the device is activated by a light beam known as an Opto-Isolato The activating device blocks the subject apparatus and method from detection from the operated electronic or electric device.

THE DRAWINGS

FIG. 1 illustrates the physical arrangement of the units employed in the apparatus herein disclosed;

FIG. 2 is a block diagram illustrating the organization and other aspects of the invention;

FIGS. 3A, 3B, 4A and 4B show the circuit of the system employed in the apparatus of the invention;

Figure 7:
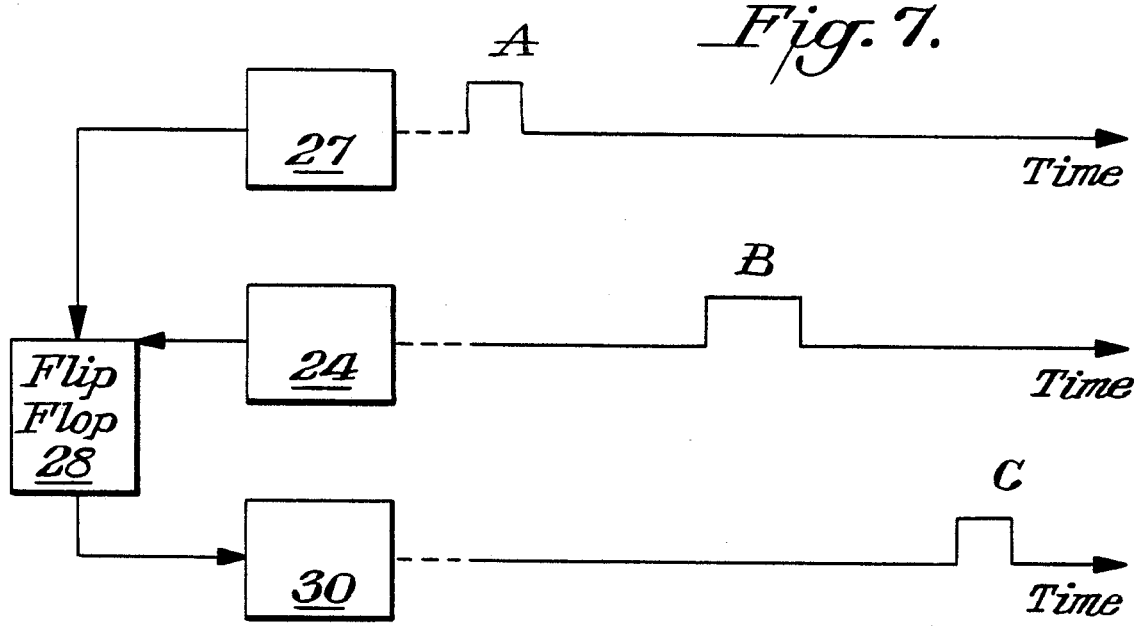
Figure 9A:
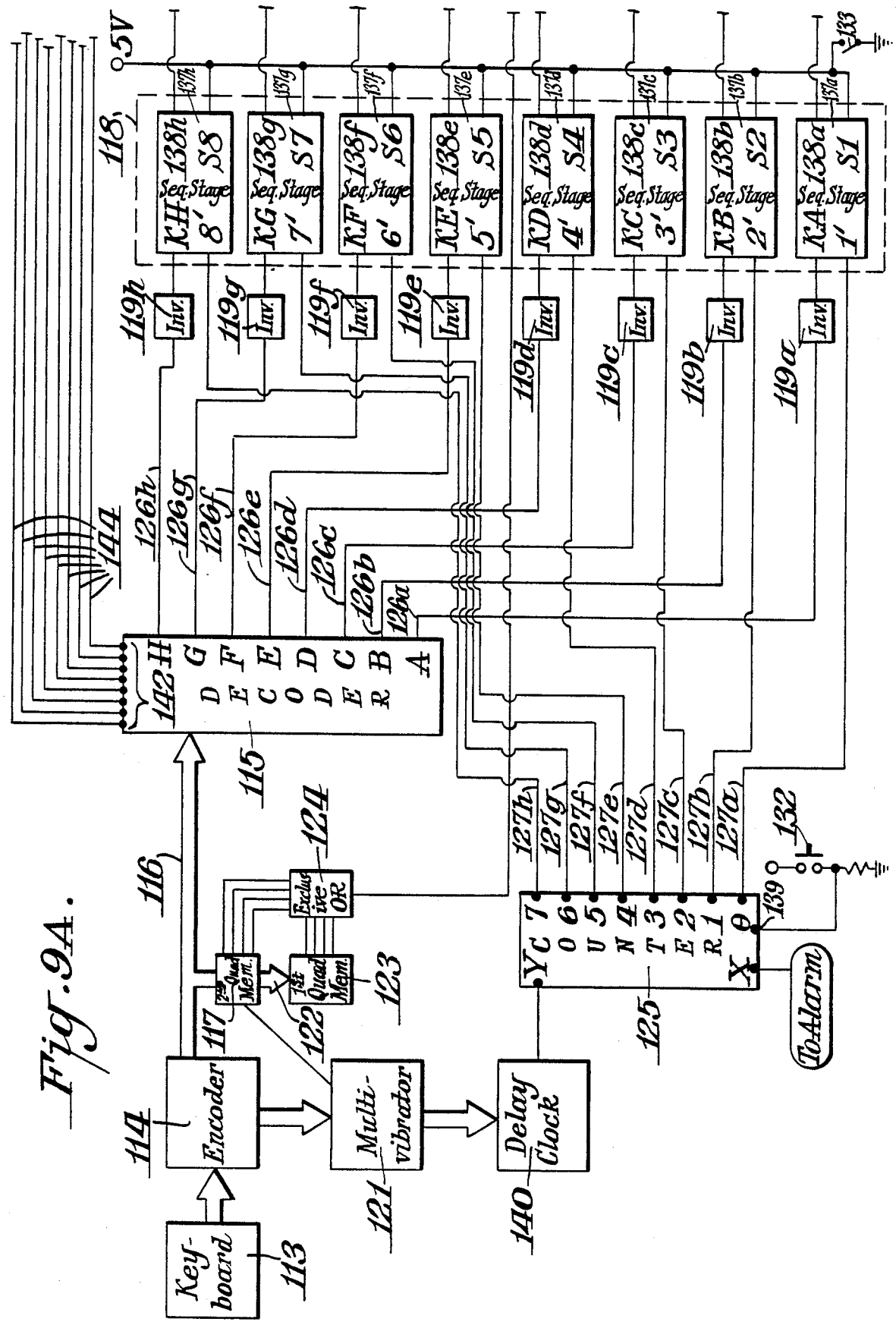
Figure 9B:
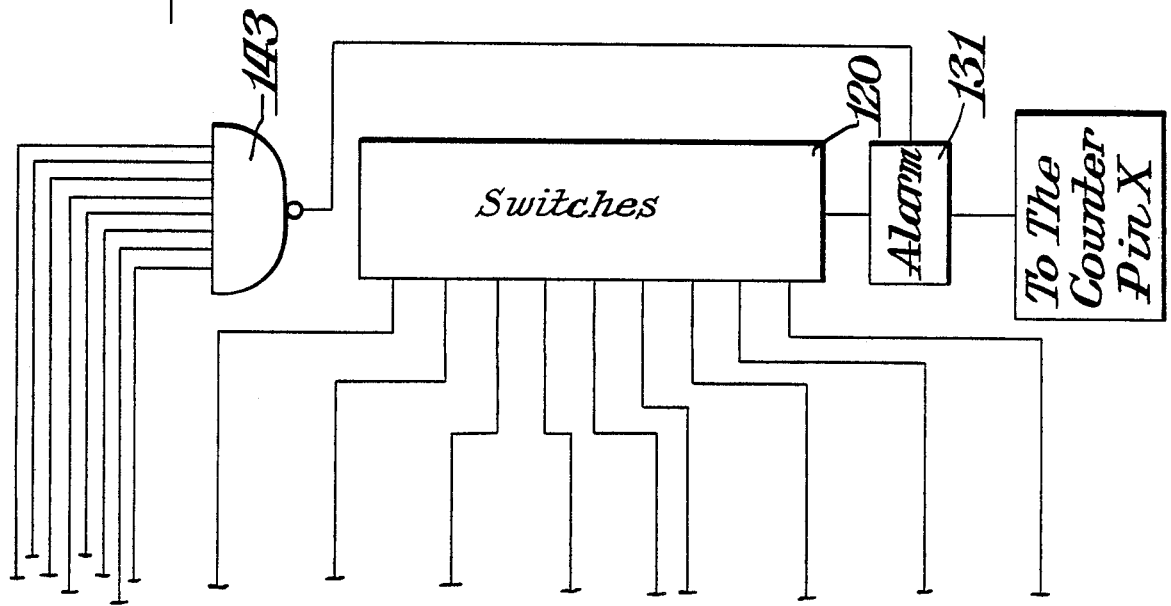
Figure 10:
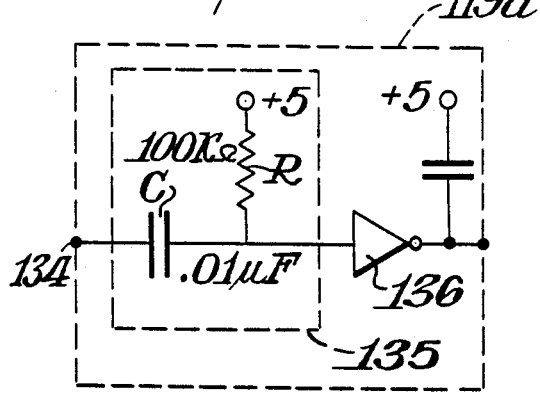
Figure 11:
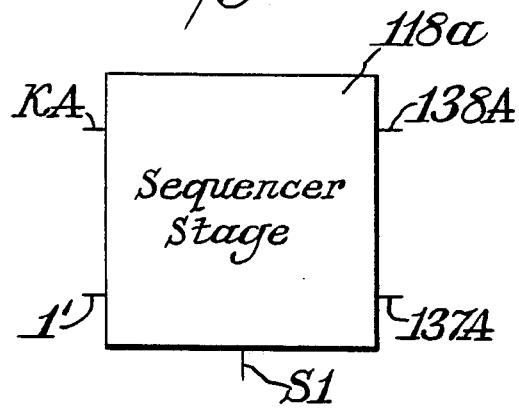
Figure 12A:
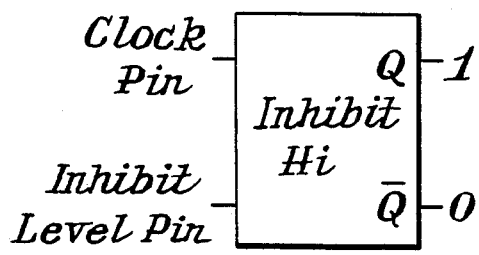
Figure 12C:
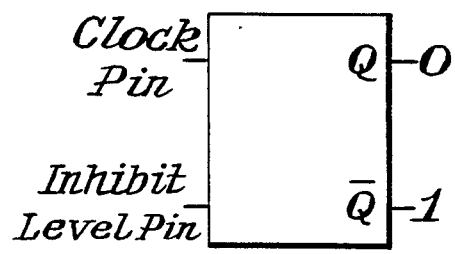
Figure 12B:
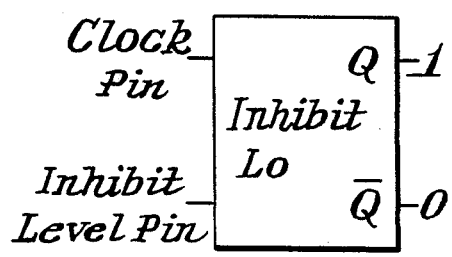
Figure 12D:
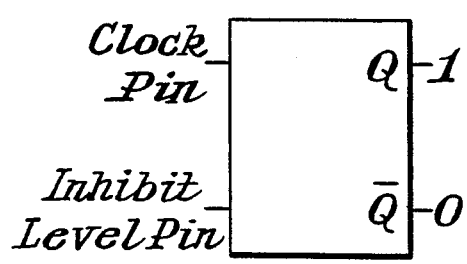

FIG. 7 comprises a graph of the matched input pulses which trigger an incapacitating pulse;

FIG. 8 is a block diagram illustrating the organization and other aspects of a preferred embodiment of the invention;

FIGS. 9A-B shows the circuit of the system of the preferred embodiment;

FIG. 10 is a representative element part of the system of the preferred embodiment;

FIG. 11 is a schematic diagram of a control circuit;

FIGS. 12A, B, C and D are diagrams of control circuits in various states;

FIG. 13 is a chart illustrating the timing of the pulses in the system of FIG. 2;

FIG. 14 is a detail of the circuit of this embodiment;

FIGS. 15 A-B are a flow chart of the procedure of the preferred embodiment.

DEFINITIONS

The following are definitions of terms as used herein;

data bus—a system for moving data by a group of wires forming a common bus.

comparator—a unit that compares two binary numbers telling whether the numbers are equal, one-greater-than-the-other or visa-versa.

multi-vibrator or flip-flop—two stages coupled so that the input of each is derived from the output of the other and have two stable states which appropriate inputs and can be changed from one state to the other by signal at the input.

monostable—a multi-vibrator circuit which changes its operation from one stable state to another when supplied with an external trigger pulse.

Schmitt trigger—a one-shot multi-vibrator in which each trigger pulse produces one complete output pulse.

binary coded decimal—a representation of an alphanumeric character converted into a strong of 1's or zeros or in a binary code which for description purposes here are in four bit groups, counter—a special kind of register made up of flip-flop circuits with one input and usually a parallel output form each flip-flop, which counts pulses arriving at the input and stores the total count in a certain code (usually binary numbers).

clock input—an input terminal on a unit typically used for receiving a timing control-clock signal, but used in some applications for a control signal or even data.

programmable—a circuit which can be set with a fixed program.

decoder—a combinational building-block receiving several parallel inputs which recognizes combinations of input bits and puts out a signal when these combinations are received.

cycle—an interval of space or time in which one set of events or phenomena is completed.

character—a symbol formed by a system for representation of information. Examples are numerals and letters.

code—a set of meanings assigned to groups of bits made up of binary representations or binary states provided by a sequence of high and low voltage areas.

exclusive-OR gate—a device with two inputs of binary digital information and one output, whose output is 1 when either input is 1 but is 0 if neither or both outputs are 1.

byte—a sequence of adjacent binary digits operated as a unit.

inhibit control circuit—used as a switch has an on-state with low resistance and an off-state with high resistance and changed from one state to the other by a bias voltage applied as a pulse.

imposter character—a character of the set code entered in the incorrect time cycle.

erroneous character—a character not in the set code.

DETAILED DESCRIPTION

As illustrated in FIG. 1 a computer control board 10 is connected to a power supply 11 through a protective apparatus 12 positioned between the control board 10 and the power supply 11. The control board 10 is representative of the electronic or electric device access to which is verified and validated by the present invention. The units 10, 11 and 12 are suitably connected. The operation of the assembled units is subject to the control of the protective apparatus 12. The protective apparatus 12 connects the control 10 to the power supply 11 when the appropriate signals are introduced into the protective apparatus 12 and voltage and current are applied to the control 10. The control 10 in turn operates appropriate computers.

Referring to FIG. 8, hexadecimal keyboard 113, keyboard encoder 114, 1-of-16 decoder 115 receive the introduction of a set of characters making up a code, such as for example the hexadecimal code, AD 12 CE 89 each character being entered in one of eight cycles. Taking as an example the first character in a first cycle it is converted into four binary digits, or bits, which constitutes the letter A in digital form namely 1010. These four bits are placed in the system and are transmitted on the data bus 116 to decoder 115 and a first quad memory 117. The terminals of decoder 115 are each hard wired to a switchable inhibiting control circuit represented here as a stage in a sequencer section 118. A selected integer, for example A, when entered on the keyboard actuates an output from the decoder 115 to one of the stages in the sequencer section 118 a zero to level transition in the clock input of the respective stage. In the sequencer stage section 118, the positive pulse transmitted from the decoder 115 causes a switching which produces a voltage output from sequencer section unless the stage receiving the pulse is at a position which has been inhibited against switching in accordance with the arrangement of the authorized character code.

Section 118 is comprised of stages 118a–h which are each respectively connected to a decade counter 125 by hardwire connections 127a–h. As described in greater detail below in connection with FIG. 9A–B, the hardwiring of the terminals of the decade counter 25 to the sequencer section 118 is coordinated to selectively transfer the pulses from the counter 125 to place the receiving stage section 118 in an inhibiting stage. In an inhibiting state the respective stage does not transmit a positive pulse applied to its clock pin and accordingly, the sequence of stages 118a–h in section 118 in the reception and identification if coded characters entered into the system at the keyboard 113.

In brief, the coordinated functions of decoder 115 and decade counter 125 with the sequencer stage section 118 preselect only one of the stages to receive an inhibiting level from the decade counter 125 and character select pulse from decoder 115. Any individual stage of the sequencer section 118 receiving a character pulse from the decoder 115 and having no inhibit level will disable the system and turn on an alarm. Therefore, in the instance of an incorrect code character the sequencer 118 issues a disabling pulse on the bus to a switch 120. This disabling pulse indicates that the hexadecimal character entered at the keyboard is not the code character for which the system is designed in the particular cycle. Actuation of switch 120 energizes an alarm 131 and may disconnect the system.

As a bar to evasion of the required sequential entry of the specific enabling code character in the given cycle the byte representing an entered character is also transmitted to the first quad memory 117 where it is stored prior to the entry of the next succeeding character. With the entry of the next character a pulse from the multivibrator 121 on lines 129 and 128 triggers the transfer of the stored byte on bus 122 from first quad memory 117 to second quad memory 123. The memories 117 and 123 are each connected to transmit the BCD to an exclusive OR gate 124 as described in greater detail below.

FIGS. 9A–B is a diagram of the circuitry of a preferred embodiment of the present invention. FIGS. 9 A–B shows the digital equipment which is employed in carrying out this invention. The purpose of this apparatus is to prevent unauthorized operation of the controls or a device, such as a computer.

In the following description, hexadecimal characters are referred to as the code characters.

These are the key parts of the system in the commencement of a review and authorization of an enabling code for accessing into equipment through the system. The operation of the system begins with the switching on of power from a suitable source. This first sends a pulse through the system which tests the processing of signals and actuates an alarm signifying the absence of an authentic character. This is the initiation of the first cycle and the initializing of the system.

At the same time with the onset of power in the system the circuitry and the operational characteristics of the components parts are initialized by their actuation with the power. One of the functions of the initialization is the introduction of a predetermined character at the encoder 114 which is converted to an inhibit level signal into counter 125 and transferred to a selected sequencer state, for example sequencer stage 118a. This inhibit level signal is transferred from the counter 125 on the respective connection line 127a to the inhibit level pin 1' of stage 118a. This occurs prior to the transmission from the decoder 115.

The following is a description of an appropriate initialization step accompanying the start of use of the present apparatus for the authentification of an entered code of character for accessing purposes. A power switch, not shown, is turned on suitably applying electricity to the apparatus. In one embodiment, the encoder 114 when the power is initially applied acts to issue binary coded decimals, BCDs, of a random nature on the bus 116 to the decoder 115. In the operation of the transferring of BCD's on the bus 116 to the quad memories 117 and 123, the sequencing sends the second of these random generated BCDs to the output of the decoder 115 and the final result of this transfer is the actuation of the alarm system in the manner of operation of the apparatus explained in detail below.

The random generated character may go either to any one of the outputs of the decoder 115. In whatever output position of the decoder 115 it acts to change a hi to a lo, the ultimate effect will be to send to one of the sequencer stages 118a–h a "hi" pulse which will switch that stage to produce an output which triggers alarm 131 as explained below. Thus, the step of activating the electrical system produces a test of the alarm system. This serves to also create a signal that the entry of a code has been undertaken.

In the embodiment the alarm is extinguished by the entry of the last two characters of the set code. A suitable actuating means (not shown) actuates a relay switch 133 so that the output on sequencer stages 18a–h are set by the positive 5 volts as illustrated in FIG. 9. A button 132 is closed to reset the counter 125 and set an inhibit on stage 118a. The circuit of button 132 is connected to the counter 125 at a terminal 139.

The first step after turning the power on is the introduction on the key pad 113 of any one of the code characters except the first code character as initialization character with the result that the encoder 114 sends the resultant BCD on the bus 116 to the decoder 115 and this transmission sets output pins A-H of the decoder 115 on a hi, with the exception of the pin selected for the pre-setting and character, which as noted above is not the first character of the code set. The decoder 115 is thus prepared for entry of the first character of the code set. The counter 125 is similarly prepared for entry of the code by closing a button 132 to apply a voltage charge setting the output of the counter 125 with a hi set on an initial output pin ∅. At the same time suitable actuation such as an infrared actuated relay switch 133 sets the sequencer stages 118a–h output so that these inhibiting control circuits are prepared to undergo switching upon triggering by a pair of hi inputs when in an on-state, as explained in detail below.

The pulse from relay switch 133 sets and resets the sequencer stages 118a–h at set pins S-1 to S-8 on the respective stages. Referring to the specific illustration of stage 118a in FIG. 11, the connection of line at set pin S-1 is shown. As described in greater detail below, the pulse at set pins S-1 sets stage 118a with a high of +5 V on a pin 137a and a low of OV on a pin 138a.

Referring again to FIGS. 9A-B the first character of the enabling code is entered by the accessor by activating the key on the keyboard 113 for this first character. Assume for example a character code set made up on the following hexadecimal sequence AD 12 CE 39. The first character A is entered on the keyboard. This is converted in the encoder 114 into four binary digits, or bits, which constitutes the letter A in digital form namely 1010. These four bits are placed in the system and are transmitted on the data bus 116 to decoder 115 and a first quad memory 117. As shown in FIGS. 9A-B eight output pins A-H of decoder 115 are each hard wired by connections 126a–h respectively to one of the inverters 119a–h and thus to one of the sequencer stages 118a–h so that the selected integer, for example A, when entered on the keyboard 113 as the first entry of the character code actuates an output from the first position pin A of the decoder 115 and the output goes to the inverter switch or NOT gate 119a which produces a zero to level transition in clock input of the sequencer stage 118a.

The operation of the inverter switches (NOT GATES) 119a–h may be understood from the representative illustration in FIG. 10 of the inverter 119a. Inverter 119a has an input terminal 134 and a half monostable circuit made up of an R-C circuits 135 attached to the input of a gate 136. The output from the gate 136 is connected to a clock pin KA of stage 118a. The terminal 134 is connected at the A position pin on the decoder 115 and selects a pulse when the A position pin shifts from a "hi" to a "lo". Thus the inverter 119a illustrated in FIG. 10 only forms a pulse when the A position pin shifts from a "hi" to a "lo". The output from the inverter 119a to the clock pin KA is a "HI". Thus the transferring of a BCD to the A position pin of the decoder 115 results in the delivery of a "hi" to the clock pin KA of sequencer stage 118a through the inverter 119a.

As noted above and referring to FIGS. 9A-B above the sequence stage 118a has received an inhibit signal from the decade counter 125 through the hardwire connection 127a to set the stage 118a at LO and the stage 118a is set in the off-state. As described in greater detail below, the hardwiring of the terminals of the decade counter 125 to the sequence stages 118a–h, respectively, and the hardwiring lines 126a–h of the decoder 115 to the stages 118a–h respectively are coordinated to provide selectivity in the reception and identification of coded characters entered into the system at the keyboard 113.

In brief, the coordinated functions of decoder 115 and decade counter 125 with the sequencer section 118 made up of stages 118a–h, preselect only one of the elements 118a–h to receive an enabling pulse from the decoder 115. The introduction of an imposter character will disable the system and turn on an alarm. Therefore, in the instance of an imposter or incorrect character the sequencer section 118 will issue a disabling pulse.

In the described example of operation the sequencer stage 118a having received the inhibit level signal setting the inhibit pin 1' at low and the stage 118a in the off-state, the pulse transmitted from the decoder 115 does not result in switching of the voltage in the sequencer stage 118a.

Referring to the operation in general, in sequencer section 118, if the positive pulse transmitted on line from an inverter 119a–h is received by a stage in the sequencer section 118, which has not received the inhibit signal and is consequently in the turned on-state then the pulse from the inverter 119 switches the voltage on the output from the respective stage of the sequencer section 118. With the switching of the voltage from this section 118 there is transmitted to the switch 120 an indication that the hexadecimal character entered at the keyboard is not the code character for which the system is designed but is an imposter character and is incorrect in that cycle.

The operation of the system in processing a character entry to verify its authenticity as a code character and establish the authority of the user can be understood in view of the following description of sequential steps.

At the start of the use as indicated above, the decade counter 125 is initialized so that all the stages 118a–h are "hi" except the selected one of the stages 118a–h, which is set with "lo" at the input pin 1'-8'. In this description hi and lo refer to voltages, (i.e. a one is t 5 v and a zero is '0' volts).

The ultimate result of this will be that a "hi" at the clock pin of any of the stages 118a–h, except the one programmed for the first correct code character, results in triggering the alarm and indicating that a wrong character has been entered.

Thus, for example, numbering the stages 118a–h through in an upward direction on the schematic, when the reset of a pin ∅ is set "hi", pins 1 through 7 are set or remain at "lo". The match up of pins ∅-7 counter 125 and pins 1'-8' of stage elements 118a–h being as follows:

| Counter 125 Pin | Stage Pin | Stage Element |
|---|---|---|
| 0-hi | 1' | 118a |
| 1-lo | 2' | 118b |
| 2-lo | 3' | 118c |
| 3-lo | 4' | 118d |
| 4-lo | 5' | 118e |
| 5-lo | 6' | 118f |
| 6-lo | 7' | 118g |
| 7-lo | 8' | 118h |

As a result the voltage of the pins ∅ thru 7 of counter result in the charge states on the respective stages 118a–h to be as follows:

| Stage | Inhibit Level Pin | Voltage Charge State |
|---|---|---|
| 118a | 1' | Lo |
| 118b | 2' | Hi |
| 118c | 3' | Hi |
| 118d | 4' | Hi |
| 118e | 5' | Hi |
| 118f | 6' | Hi |
| 118g | 7' | Hi |
| 118h | 8' | Hi |

At this state the system is prepared for the entry by an operator of the first identifying code character, as for example, for the purpose of gaining access to a computer system.

Next, referring to the 1-of-16 decoder 115, the role of this element decoder 115 is to receive an impulse representative of a binary coded decimal and which translated into a position in turn results in a change of state for a pin of the decoder 115. In this embodiment eight pins A thru H of the decoder 115 are the code set and are activated by BCD's from the keyboard 113 and encoder 114. These pins A-H are hardwired by connections 126a–h respectively through inverters 119a–h to clock pins KA-KH of the respective stage elements 118a–h as follows:

| Recorder 15 Output Pin in Code Positions | Stage on Sequencer Clock Pin | Sequencer State |
|---|---|---|
| A | KA | 118a |
| B | KB | 118b |
| C | KC | 118c |
| D | KD | 118d |
| E | KE | 118e |
| F | KF | 118f |
| G | KG | 118g |
| H | KH | 118h |

When actuated the selected decoder 115 output pin A-H goes from "hi" to "lo". This actuates the respective inverter 119 comprised of R-C circuits 135 and not gate 136 which couples, inverts and shapes the high to low transition which occurs on a code output pin of the decoder 115, which is transferred to the appropriate clock input of the respective element in section 118.

In the decoder 115 eight output pins A, B, C, D, E, F, G and H make a set of code positions. These are pins A-H of decoder 115 that receive the code characters entered at the keyboard 113 and the selection of the position of the output pin determines which of the sequencer stages 118a–h will receive the clock pulse resulting from the respective entered code character.

Each stage 118a–h has five terminals providing pin positions as follows:

| Stage | Clock Input Pin | Inhibit Level Pin | Hi Output Pin | Lo Output Pin | S-Pin |
|---|---|---|---|---|---|
| 118a | KA | 1' | 137A | 138A | S-1 |
| 118b | KB | 2' | 137B | 138B | S-2 |
| 118c | KC | 3' | 137C | 138C | S-3 |
| 118d | KD | 4' | 137D | 138D | S-4 |
| 118e | KE | 5' | 137E | 138E | S-5 |
| 118f | KF | 6' | 137F | 138F | S-6 |
| 118g | KG | 7' | 137G | 138G | S-7 |
| 118h | KH | 8' | 137H | 138H | S-8 |

Referring further to respective stages 118a–h as illustrated in FIG. 9, they have each the respective output pins 137a–h and 138a–h. Also each stage 118a–h has a respective pin S-1 to S-8.

Reference is now made to FIG. 11. This FIG. 11 shows as a representative element the stage 118a with the five terminals consisting of a clock input pin KA, inhibit pin 1', two outputs 137a and 138a and a pin S-1. Output 138a is normally a high or logical one. Output 137a is normally a low or logical zero.

The stage 118a is capable of issuing a pulse "one"- from the pin 137A. This occurs when the stage 118a is switched and the pin 137A goes hi with pin 138A going 10 and this change causes a "one" pulse to be issued from the pin 137A.

The stage 118a is switched when both the pin 1' and the clock pin KA are high. In the present example when the pin 1' is low as described above the stage element 118a is NOT switched. Whereas a clock pulse to one of the other clock pins KB-KH would switch the respective stage 118b–h and cause an output of a "hi" or a "one". In this embodiment the pin 137A and pin 138A change on the trailing edge of a negative pulse on the clock pin KA when pin 1' is high.

Referring to FIGS. 9A-B the switching of a "one" at the sequencer stage also actuates an inhibit pin X of the counter 125. Thus a "one" pulse to the switch 120 causes an inhibiting of the decade counter 125 which shuts the accessing off and thus prevents any further effort at identification, recognition and access. The alarm 131 is connected to pin X of counter 125.

The absence of a "one" pulse on the other hand maintains the accessing operation and leaves the system in condition for advancing to the reception of the introduction of the next identifying character.

The preparation of the system for the next cycle is best understood by reference to a delay clock 140 in FIG. 8 and FIGS. 9A-9B.

At the same time that the data transfer from the keyboard to the counter 125 takes place a pulse is delivered to the delay clock 140. The delay in the clock 140 awaits the outcome of the processing of the entered character. If the code character has been correct then the authenticiation procedure is not stopped. Then it is time to move the hi on the counter to the next output pin 1. After a delay of the "any key pressed pulse" from the keyboard in the clock 140, the delay clock pulse is transmitted to the input pin Y of the counter 125 to bring about the automatic incrementing through the counter 125. This incrementation with each pulse received moves the hi to the next adjacent pin of the counter 125.

For example, at the initialization of the apparatus described above, the resetting of the counter 125 sets counter pin ∅ at "hi", with the other pins 1-7 set at lo.

As a result, through the line 127A this sets inhibit level pin 1' of stage 118a at lo. Similarly the incrementation by the "any key pressed pulse" sets counter pin 1 at hi with the other pins ∅ and 2-7 set at low. As a result through not line 127b this in turn inhibits pin 2' of the element 118b in readiness for the next entry on the keyboard 113. When the counter 125 increments through pin 7 to the end of the code set, the logic of the operation is that all the characters have been correctly identified and the authentication has been completed.

FIGS. 12a-12d illustrate the different effect of the reception of the clock pulse in a control circuit under the two different conditions of an inhibit level hi and an inhibit level lo. It will be seen that the reception of the clock pulse hi in the FIG. 12c results in a switch in the outputs which is accompanied by an output pulse, while this does not occur in FIG. 12d.

FIG. 13 is a chart illustrating the timing of the pulses from the key press operation in the keyboard. Viewing the charted sequence from left to right it is seen that from the start of the key depression there is a 4 millisecond or 4,000,000 nanosecond, period before the data transfer to the decoder 115. This 4 millisecond period accommodates the mechanical action identified as key debounce. At the end of this initial period two periods start simultaneously. These are illustrated on the chart next to the right of the key debounce period. They are identified as data transfer to decoder 115 and the delay cycle.

The data is transferred to the decoder 115 in 7,000 nano-seconds and immediately the pulse transfer over the connection 126 thru inverter stage 119 to sequencer stage 118 takes place in 800 nanoseconds. This completes the entry of a correct code character, and also sets off alarm if the character is an imposter.

In the delay cycle after 10,000,000 nanoseconds a pulse is emitted from the delay 140 to the Y pin of the counter 25. This increments the counter 125 and resets the system for the receipt of the entry of the next character at the keyboard 13.

Because the first character introduced was the correct character and the system is not shut down, the system is, therefore, prepared to receive the introduction and authentication of the next character.

Referring again to FIG. 9AB, eight positions of the decoder 115 have output pins 142. Each of these positions represent one of the hexadecimal characters which is not in the code set. The output pins 142 are individually hardwired to a NAND gate 143 by the individual connections 144. Thus, one of the erroneous or non-code set hexadecimal characters, if entered on keyboard 113 and encoder 114 will be transferred to its respective output pin 142 of decoder 115. And changing that pin 142 from hi to lo transfers an input to the NAND gate 143 which transmits a signal actuating the alarm, just like the results occurring when one of the sequence stages 118a-h is switched.

In the sequence of signals the NAND gate 143 receives from the decoder a lo pulse from the erroneous code character entry as received on the non-used output pins 142. The NAND gate 143 turns this to a hi which becomes the actuating pulse for turning on alarm 131.

As pointed out above, the processing of the BCDs through the quad memories 117 and 123 is connected to and associated with the exclusive OR gate 124 so as to produce a positive output from the gate 124 if the same character is entered at the keyboard 113 twice in succession. As illustrated by FIG. 9A, the multivibrator 121 acts to shift the byte in quad memory 117 to the second quad memory 123 and also to take the later byte from the encoder 114 into the quad memory. When the same character is entered twice in succession, even if the first is an authentic code character, the repetition is necessarily an imposter and improper. The exclusive OR gate 124 is suitably connected to the alarm 131, so as to also set off the alarm 131 on the production of an output from gate 124. To be identified as an imposter character entering the signals from the quad memories 117 and 123 to the NOR gate must be all the same. Thus the EXCLUSIVE OR operation is used to establish the successive entries of identical characters.

Referring to FIG. 14, a detail of the circuit of the quad memories 117 and 123 and the EXCLUSIVE OR gates 145 is shown. The memories 117 and 123 are two sets of latches. On each keyboard 113 entry of BCD is first registered in the quad memory 117 and on the next keyboard 113 entry this BCD is shifted to and registered in quad memory 123 and the second BCD is registered in memory 117. The bits comprising these BCDs appear on the input of gates 145 the output of which is transferred to the NOR gate 146 so that a combination of all lo pulses input to gate 146 result in an inversion to a positive signal to the alarm 131. On the other hand, a single hi on any of the gate 146 inputs negates a positive output from gate 146.

Figure 15A:
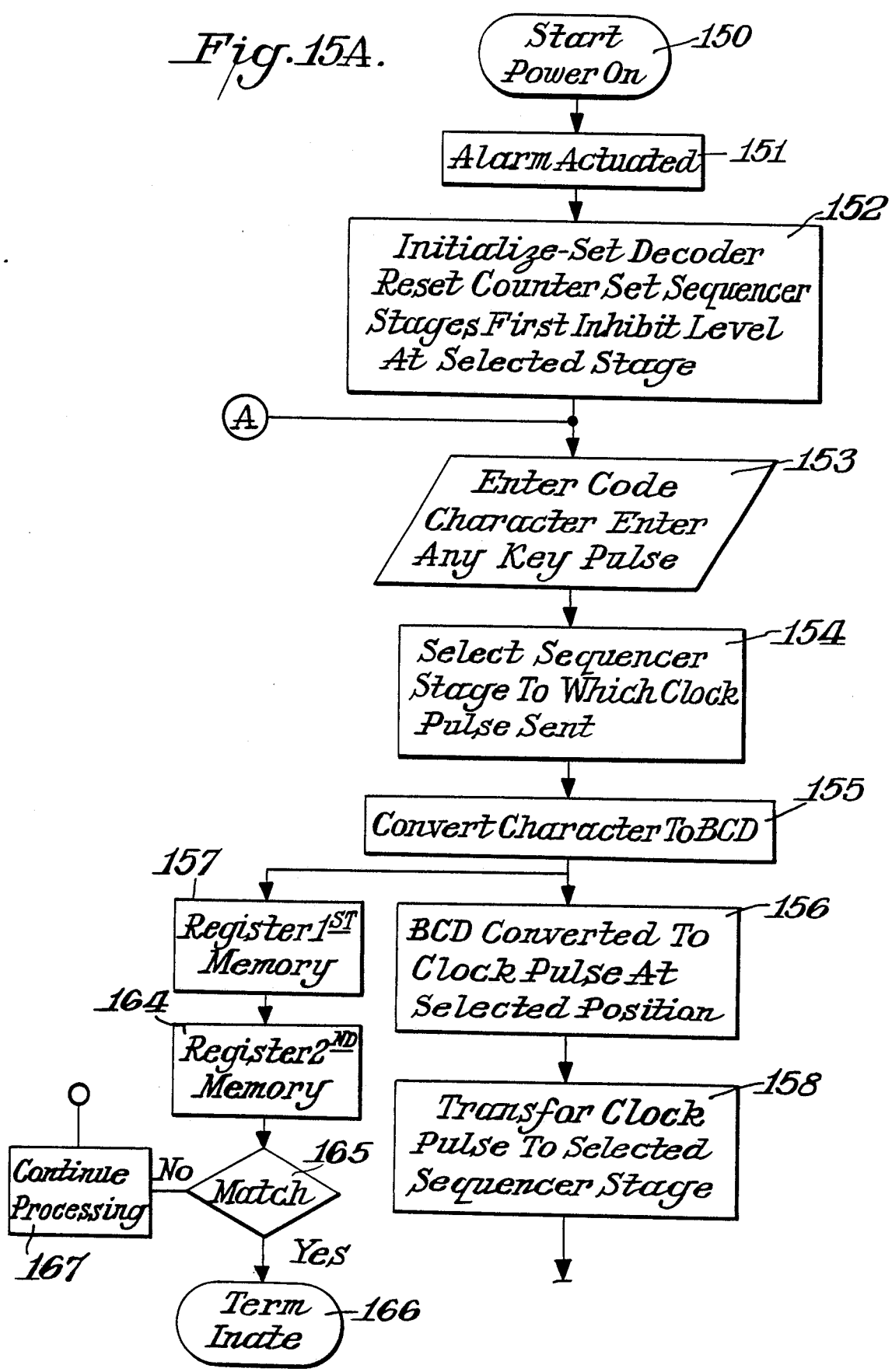

The flow chart of FIGS. 15A-B describes the steps to be taken when carrying out the application of the present process and apparatus. The flow chart assists in an understanding of the logic as developed here. After the apparatus is enabled as represented by oval 150, FIG. 15. A as represented by block 151, BCDs in the system being converted to output of the decoder 115 test the system by actuating the alarm 131. Then the apparatus is initialized as represented by block 152. An input of one of the characters of the code set other than the first character is entered from the keyboard 113 and sets the decoder 115. The button 132 is closed to reset the counter 125 and sets an inhibit on stage 118a a hi on the pin ∅. A suitable actuating means actuates relay switch 133 so that the outputs on the sequencer stages 118a-h are set.

As a result the sequencer stage 118a is set with the inhibit level pin 1' at lo while the decoder 115 is set with a pin A set at hi. Also in the sequencer stages 118b-h the inhibit level pin 2'-8' are all set at hi.

The first code character is entered at the keyboard 113 in the next step represented by the parallelogram 153. By the same step any key pressed pulse is entered. The entry of the character selects which of the sequencer stages 118a-h the resultant clock pulse will be transferred as determined by the hardwiring of the apparatus, and as represented by block 154.

The hexadecimal character is converted to a BCD in the encoder 114 as represented by block 155. The BCD is transferred to the decoder 115 and to the first quad memory 117 as represented by blocks 156 and 157 respectively. The BCD in the decoder 115 is converted to a clock pulse as represented by block 158 and the BCD in the quad memory 117 applies an output on the exclusive or gate 124. The clock pulse is next transferred to the previously selected sequencer state as represented by block 158.

As a result a judgment is made as represented by the diamond 159 whether the sequencer stage selected in the initializing is the same as the sequencer stage 118a-h selected after the entry of the code character. If a match is established the processing continues. If a match is not established a signal is sent to the alarm 131 as represented by parallelogram 163.

As shown in FIGS. 15A-B, the judgment of the entry of an authentic code character at the proper interval results in a logic "yes" and to proceed with the authorizing procedure. The next step is another decision point represented by the diamond 160 asking the question, is this the end of code. If condition of eight authentic code characters entered is established, a signal is sent indicating completion of the code entry and authorization for accessing. This is represented by the parallelogram 161 indicating the accessing takes place.

If the judgment is that less than eight code characters have been entered the delayed any key pressed pulse from the delay clock 140 results in the setting of the inhibit level at lo in the next adjacent sequencer stage 118b as represented by block 162.

If an additional entry is thus called for the apparatus is in condition for the entry of the next code character as represented by the parallelogram 153 and the authorizing procedure is repeated.

As shown in FIG. 15A when the code character is converted at BCD as represented by block 155, the BCD is registered in the first quad memory 117 as represented by block 157. Upon entry of the next code character the previous BCD is shifted to the second quad memory 123 as represented by block 164. Then a judgment is made at the decision point represented by diamond 165 as to whether the BCDs in memories 117 and 123 are the same. If the condition of the identicalness is established then the processing is terminated as represented by the oval 166. If a condition of difference between the BCD's is established processing continues as represented by block 167.

Another embodiment of the protective system is illustrated in the following description. The protective system is arranged to detect the correct signal introduced into the protective system and to actuate appropriate alarms and actions if incorrect information is introduced into the protective system. Also the protective system is provided with means for detecting and announcing by an alarm an unauthorized cutting of the power from the power supply.

It is a feature of the protective system that once having been activated it cannot be unplugged or have its power disconnected with activating an alarm.

FIG. 2 is a general diagram of the circuitry. FIG. 2 shows the digital equipment which, is employed in carrying out this invention. The purpose of this apparatus is to prevent unauthorized operation of the controls of a device such as a computer. In this apparatus system, an internal reference binary coded decimal of an alphanumeric character is compared with an input binary coded decimal. When the comparison has been made and the result indicates that the binary coded decimal of the input is not equal to the reference binary coded decimal, an output is generated which either activates an alarm or in some other way signals the fact that the two integers are not equal when compared. Other appropriate action can be initiated. On the other hand, if the compared binary coded decimals are equal no alarm or other action result will be sounded because it will have been established that the compared inputs being equal the special code for access to the control board is being properly introduced into the system. Further, the verifying response will be utilized in the production of a signal which results in the operation of the device.

In the following detailed description, integers represent the alphanumeric characters.

Referring to FIG. 2, ASCII keyboard 13, a decade counter 14, a not gate 15 and a binary counter 16 receive the designation of a selected integer, for example, the integer 3 and convert it into the four binary digits, or bits, which constitutes the numeral 3 in digital form namely 0011. These four bits are placed in the system. The actuation of the integer, for example 3, in the keyboard 13 also generates a "any key pressed" pulse which is applied to a second decade counter 17. It is noted that in one form of this invention, the pulse involves a time period of the order of 2 microseconds or 2000 nanoseconds.

When the keyboard 13 is operated to introduce an actuating signal by the actuation of specific keys of the keyboard according to the designated sequence, the keys are actuated separate and successively in accordance with the sequence. Each selected integer when entered on the keyboard actuates an output from the decade counter 14 to the not gate 15 which acting as an inverter is turned on by the positive voltage pulse to transmit a signal to the binary counter 16.

The schedule of the operations for the conversion of the integer to the binary coded decimal is governed by a clock 18 which drives both the decade counter 14 and the binary counter 16. The clock frequency is the master frequency which times the pulses of the output from the counter 16.

Figure 3A:
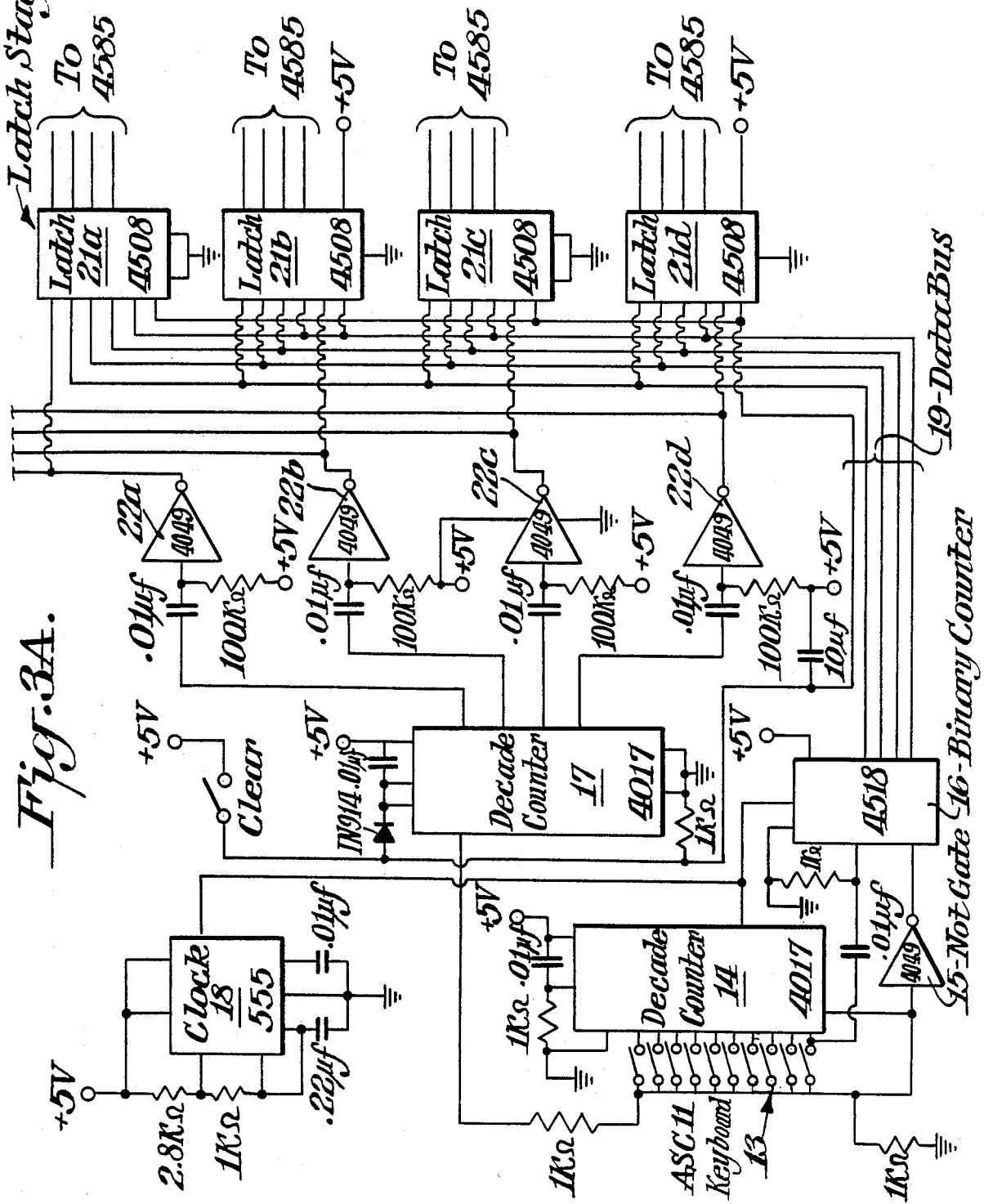
Figure 3B:
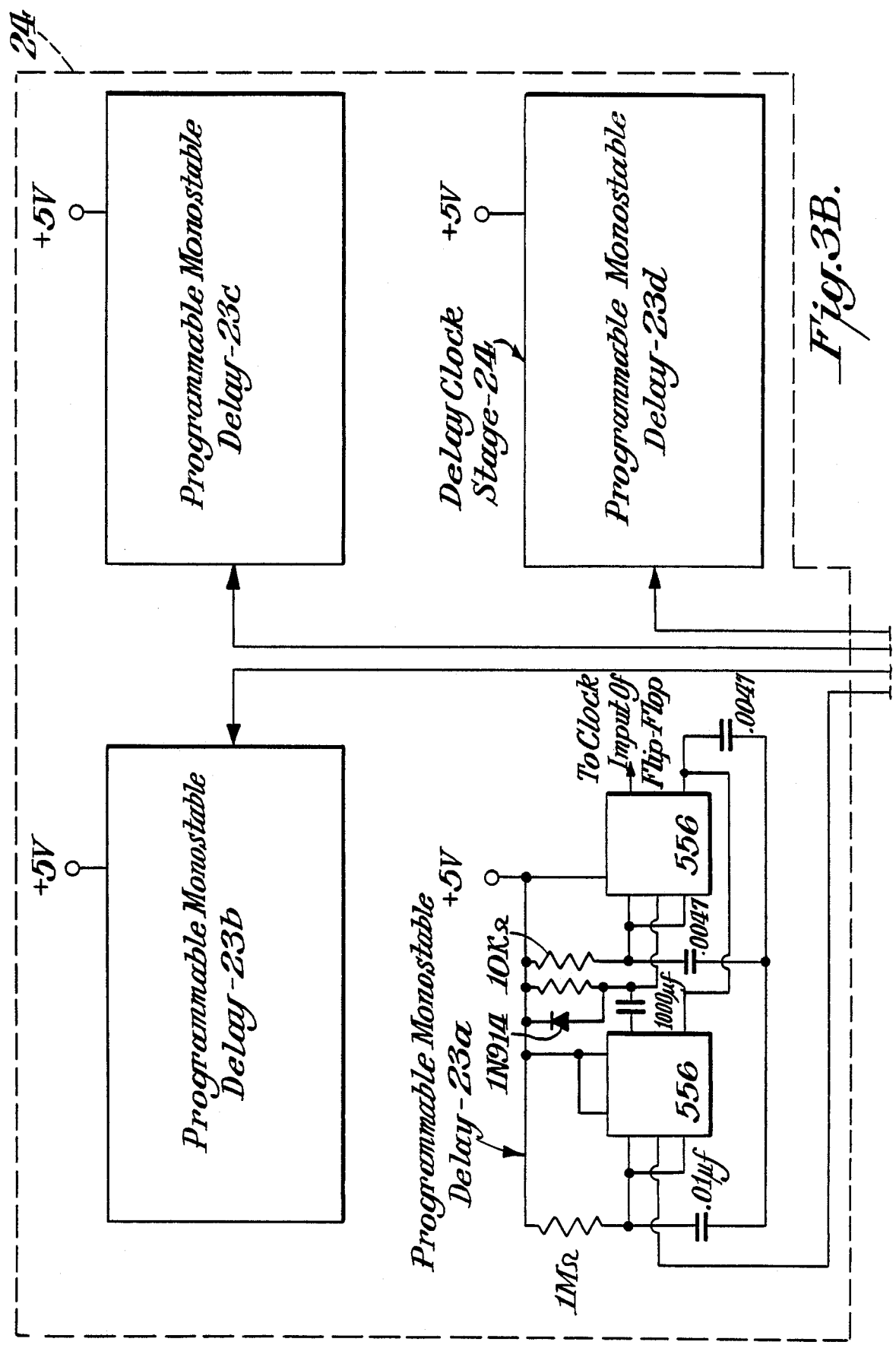

The output from gate 15 steps the counting at the number pressed on the keyboard 13 and fed to the counter 16 is converted from the selected integer to a binary coded decimal consisting of 4 bits and hereinafter referred to as a nybble. The data nybble is placed on the data bus 19 from counter 16 and is transmitted to a hold and latch stage 20 where its stored in a selected latch of stage 20 which contains latches 21a, 21b, 21c, and 21d illustrated in FIG. 3A.

In the following description of FIG. 2 the processing of one of the integers and its binary coded decimal is traced through the apparatus. The coded decade counter 17 is incremented successively with the entry of each integer at the keyboard 13 by any key pressed pulse. A step-by-step incrementing of the output of counter 17 is transmitted to a not gate inverter represented by 22 in FIG. 2 through which the incremented output from the counter 17 is fed to the stored stage 20 through a not gate stage 21. Thus, with each successive entry of the sequenced integers at the keyboard 13 the counter 17 transmits a pulse to the stage 20 while the counter 16 converts the entered integer to a binary coded decimal which is transmitted by the data bas 19 to the latch stage 20 where it is stored.

Thus each time an integer is entered from the keyboard 13, the binary decimal equivalent is placed on the data bus 19 and the binary decimal is stored in the latch stage 20. The stage 20 includes data latches 21a-21d as explained below in relation to FIG. 3A. An appropriate latch 21a-d is selected by the half monostables output from the gates 22a-d which are in stage 22 also described below.

For each sequenced integer there is an output pulse from inverter not gate 22 which transmits a leading edge to a delayed clock stage 21 connected to the inverter not gate stage 22. These pulses are fed to a delayed clock stage 24 with each successive entry at the keyboard.

Figure 4A:
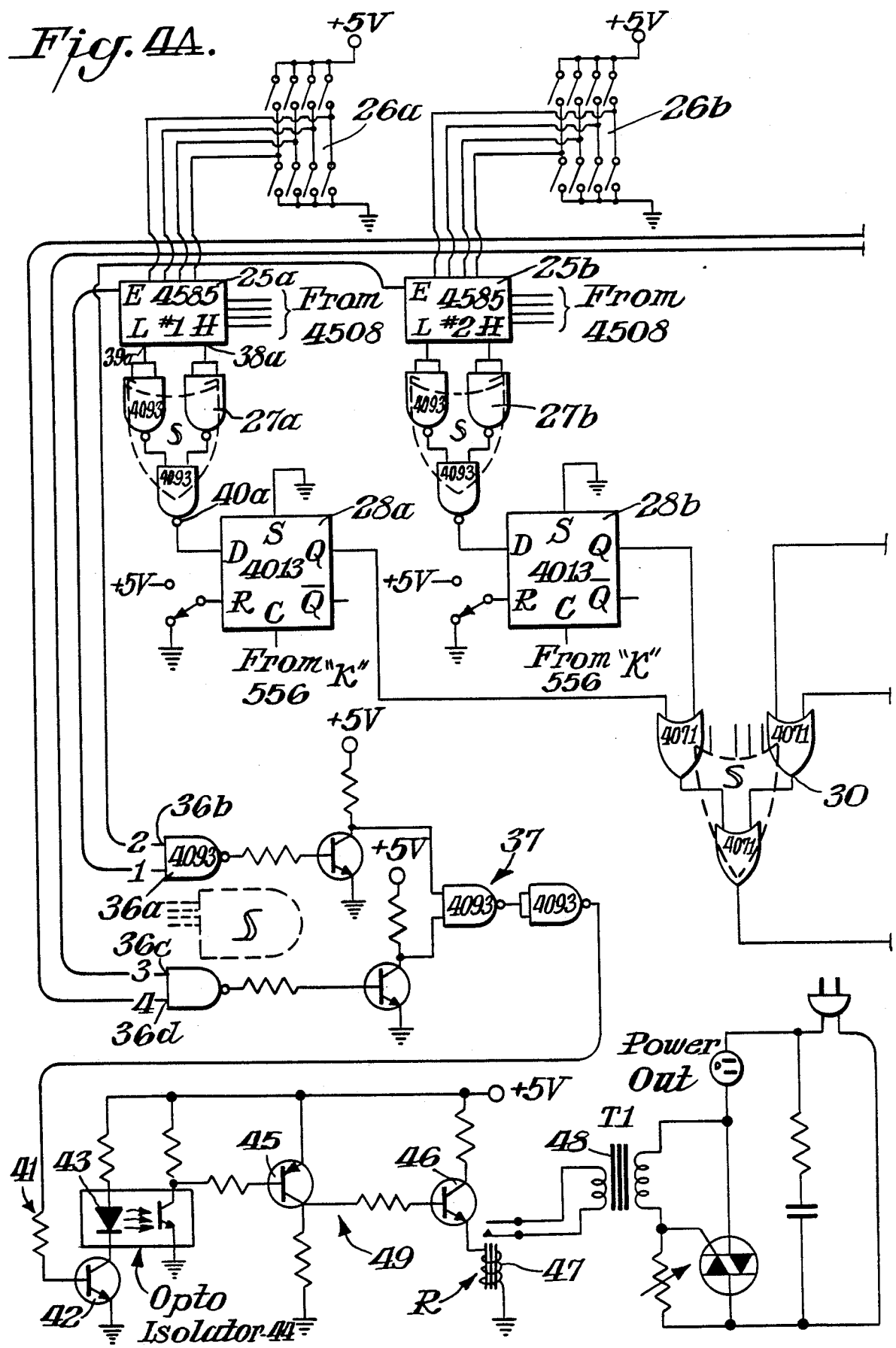

The signal from the hold and latch stage 20 is transmitted to a comparator stage 25 made up of four comparators 25a, 25b, 25c and 25d in the described embodiment illustrated in FIGS. 4A and 4B.

The valid integer is introduced into the comparator stage 25 in the form of binary coded decimals from switches represented in FIG. 2 at 26. The data nybble made up four bits is the internal reference numeral to be matched by the integer input represented by the binary coded decimal form the hold and latch stage 20.

In this comparator stage 25 the input integer, as represented by the binary coded decimal from the latch and hold stage 20 and the internal reference integer as represented by the binary coded decimal entered form the switch 26 are compared. The comparison of the input integer and the internal reference numeral in the comparator stage 25 determines whether input integer is equal to the reference numeral. Referring to FIG. 2 an output signal from stage 25 is received by an activating means 112. Now, reference is made to FIG. 3A.

If the integer is different, the input integer is either larger or smaller than the reference numeral integer. If the input integer is larger than the reference numeral there is an output pulse from the comparator proceeds to a Schmitt trigger 27 through the connection A. If the input integer is smaller than the reference integer, the output pulse from the comparator stage 25 proceeds to an OR gate represented at 27. If the input integer equals the reference integer an output pulse from the comparator stage 25 and an AND gate 37. The utilization of this pulse to the AND gate 37 to provide a signal through the isolation device is described below. The AND gate 37 is comprised of NAND gates identified by 4093 and two NPN transistors.

If the output from the comparator stage 25 indicates the integer is not equal, the pulse to the OR gate is shaped to a well-defined positive output pulse to a matching circuit represented at 28. At circuit 28 there is matching to a delayed clock pulse from the delayed clock stage 24. This matching which activates invalidating action is described below.

Now referring to FIGS. 2, 3A, 3B, 4A and 4B details of the protective system may be seen. FIG. 2 is a general block diagram of the circuitry of FIGS. 3A, 3B, 4A and 4B. The clock 18 is an IC chip configured for a stable operation oscillating at approximately 2 Khz to drive both the decade counter 14 and the binary counter 16. The clock 18 has a suitably powered power supply network from a 5 volt power source. The encoder assembly of the keyboard 13, decade counter 14, NOT gate 15 and binary counter 16 under the timing pulses of clock 18 enter the integers selected by key actuation and convert the selected integer to a binary coded decimal by a positive pulse applied to the input 34 of gate 15 from the output 31 of counter 14. The counter 14 and 16 are powered by a 5 volt source. This positive pulse on gate 15 generates a pulse on the input 32 of the binary counter 16. This input pulse is converted to a binary code in counter 16 of four bits. The four wires A, B, C and D of of the data bus 19 each transmit one of the bits so that the data information in the four bits is transmitted in the data bus 19 by the wires A, B, C, and D. The combined 4 bits on the data bus in the nybble. The nybble, which represent an integer is fed from the counter 16 for storage to the hold and follow latch stage 20 made up of four data latches 21a-d. The latches 21a-d receive from the data bus 19 and transmit the bits of the nybble when a pulse is received from decade counter 17 as transmitted by gates 22a-d of the NOT gate stage 22.

The "any key pressed" pulse is also generated by the keypad encoder. This pulse is used to increment the decade counter 17. The four outputs from counter 17 are connected to four inputs of the inverter gates 22a-d each of which are configured as a half mono stable or edge detector. The output from these half monostables go to two sections of the unit. The first section is the a programmable monostable stage 20. The pulse is directed to store pin 35 of latches 21a-d. The trailing edge section of the pulse enables the data nybble to be placed on the data bus by the binary counter 16. This data nybble is to be stored in the selected latch 21a-d. The clock 18, the counter 14, 16 and 17 and the gates 22a-d are powered by a 5 volt supply.

The other destination of the output from the half monostables 22a-d is programmable monostables 23a-d one for each bit, in the stage 24 which functions as a delayed clock pulse for the matching stage 28 made up of four flip-flop circuits 28a-d. The flip-flop 28a-d matches the output of the monostables 23a-d of stage 24 with the output of comparator 25. A further description of this matching is set forth below.

The respective valid internal reference numerals are set in the comparators 25a-d by entry from the respective sets of feed switches 26a-d. The feed switches 26a-d are similar. In the present description only that for switches 26a will be described, but the description will apply in all respect to the structure of and processing from feed switches 26b, c and d.

An internal reference numeral of the valid sequence is entered into comparator 25a from feed switch 26a by punching the binary coded decimal for the reference numeral into the signal pulse, single throw dual in line switch terminals making up the feed switch 26a. The reference numeral is stored in the comparator 25a for comparison with the integer entered from the keyboard 13 and stored in the latch 21a. Comparator 25a is a four bit magnitude comparison circuit receiving the binary coded decimal from the latch 21a on the data bus 19.

The comparison of the reference numeral and the keyboard entered integer in the comparator 25a results in the logic which asks whether the compared numeral and integer are equal or the entered integer is greater than the reference numeral, or the entered integer is less than the reference numeral. Thus three results are possible. If the numeral and integer are equal the comparator 25a transmits a logical one on input 36a of an AND gate 37. If the entered integer is greater than the reference numeral the comparator 25 transmits a positive pulse to the high input 38a of the OR gate 27a . If the entered integer is less than the reference numeral, the comparator 25a enters a positive pulse on either the high input 38a or the low input 39a results in an output pulse from the, output 40a of the OR gate 27a embodied herein on Schmitt trigger. The output signal from output 40a is fed to the flip-flop 28a. The delayed clock pulse from monostable 23a is matched with the output pulse from OR gate 27a and if the compared binary coded decimals are not equal a pulse is fed to the pulse conditioning circuit 30.

With each integer entered at the keyboard 13 and fed through the inverter NOT gate 22a a delayed clock pulse is fed from delay 23a to the flip-flop 28a. The signal of the delayed clock pulse at flip-flop 28a produces an output from flip-flop 28a to the OR gate 30 when the flip-flop has been conditioned with a one pulse from OR gate 27.

The signal from flip-flop 28a to the OR gate 30 is either a logical 1 pulse or a logical 0. If the flip-flop 28a has received a positive pulse from output 40a of OR gate 27a a logical one pulse is fed to gate 30 and an output from gate 30 of a logical 1 is transmitted as a signal to the alarm 29. Accordingly, the entry of an incorrect integer at the keyboard 13 is identified.

The clock pulse from stage 24 in general and one of the delay 23a–d in particular must be delayed in order to permit the processing at the comparator stage 25 and in the OR gates 27a–d to occur. Referring in particular to flip-flop circuit 28a the function of the apparatus centers on the matching of the delayed clock pulse with the presence of a one at pin D of the circuit 28a. When the circuit 28a is put in a reset state the 5 volt potential is applied at pin R this sets output pin Q at 0 and $\overline{Q}$ at 1 and pin D at 1. If the comparison operation finds the input integer to be valid, the OR gate 27a produces a 0 to the circuit 28a and the 1 at pin D disappears. The delayed clock pulse subsequently applied to circuit 28a lacks a matching pulse and no output from pin Q results.

The flip-flop 28a transmits a logical 0 to the gate 30. Consequently, no signal from gate 30 is generated, signifying an absence of an incorrect integer entry at keyboard 13.

To the contrary, a not equal results from the comparison resulting in a positive pulse from OR gate 27a leaves the one on pin D of circuit 28a. A way to get this one across to the out pin Q is by application of the clock pulse and this is what occurs and alarm is sounded or other appropriate invalidating action is instituted.

FIG. 7 shows a graph of the relation to the signals of the circuit 28a–d and the output therefrom. Referring again to the processing which compares binary coded decimals at comparator 25a, in the graph it can be seen that the positive pulse processing from gate 27a to circuit 28a at a point in time. Subsequent in time the delayed clock pulse proceeds from delay 23a of the delayed clock stage. This results in the output pulse from pin Q to gate 30.

If alarm 29 is not activated after the first integer then the next integer is entered and so forth until the entire sequence has been entered successfully. After the proper 4 digit sequence has been entered, the four inputs to the functional "and" gate 37 will le logical ones. Under this condition a positive level output form the circuit 41 and is directed to the base of transistor 42 of circuit 41. Transistor 42 activates the light emitting diode 43 in the opto isolator 44. This opto isolator 44 turns on the PNP transistor 45 in circuit 49. This transistor 45 causes base current to flow in the transistor 46 which turns on relay 47. Relay 47 is connected to the secondary of a transformer 48. The shorting of the secondary of 48 causes voltage and current to be applied to the power consuming device attached.

Figure 5:
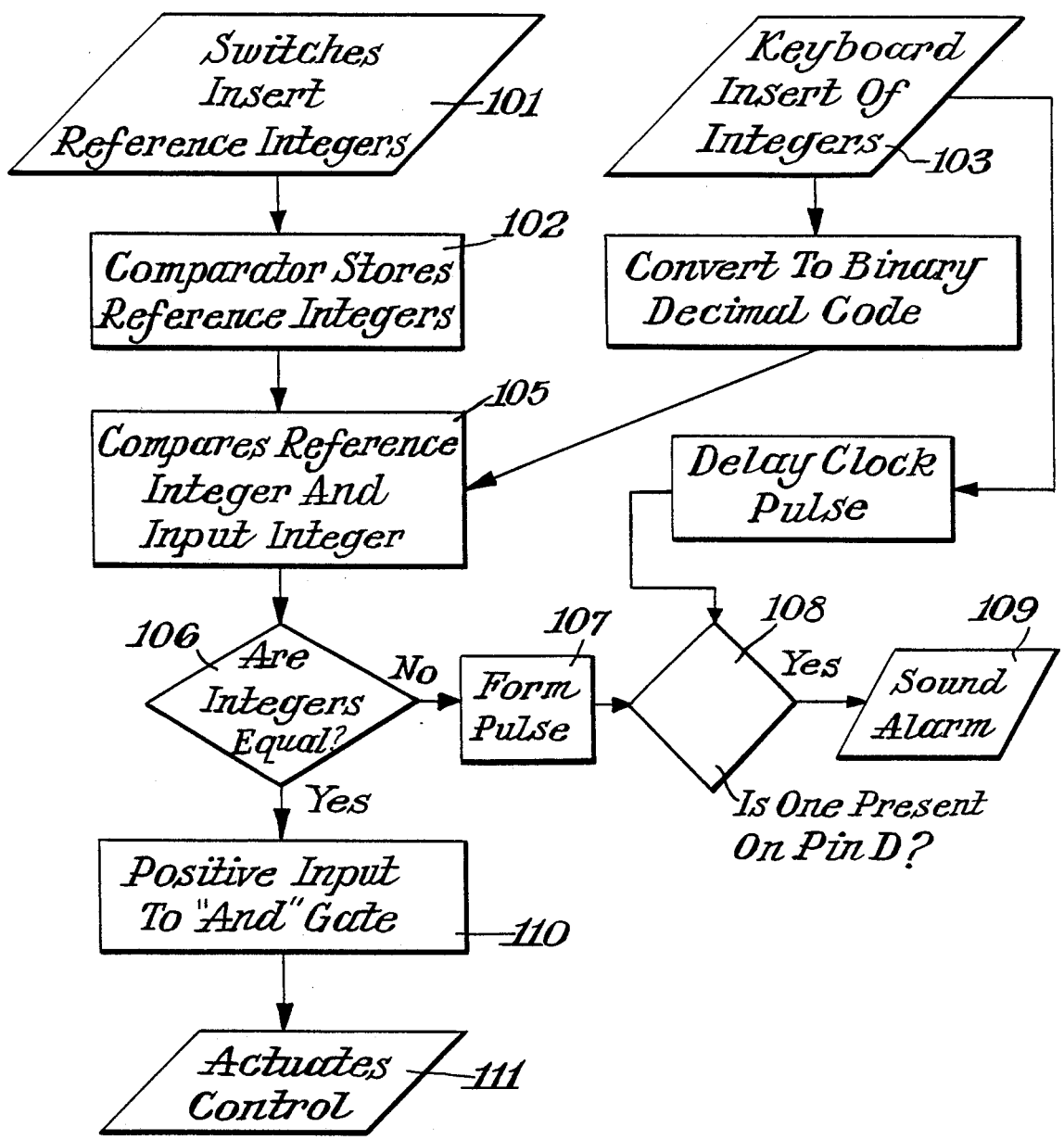
FIG. 5 is a flow chart of parts of the procedure using flow chart symbols in English narrative descriptions.

FIG. 5 shows the flow chart from the system illustrated in FIGS. 2 through 4B. In FIG. 5 the input and output steps are shown within the irregular parallelograms, the function steps are within the rectangles, whereas logic step is shown within the diamond-shape parallelogram and the arrows indicate the flow direction.

An insert 101 of reference integers stores the coded numbers in the comparator. This function step, indicated by reference numeral 102, makes the numbers available for comparison. An insert 102 of integers selected at the keyboard inserts the integers shown at 103 into a step of conversion to binary decimal code indicated by reference numeral 104. The reference integers and the key inserted integers are compared in the function step 105. Having available the reference integers and the key inserted integers the comparator asks a logical question 106, are the integers equal or non-equal. If the integers are not equal, i.e. the keyboard inserted integer is either greater than or less than the reference integer. Then, the signal to the OR gate forms a pulse, the function is indicated by 107. The keyboard inserts a pulse which is delayed at 108 and then matched to the pulse formed at 107. The question is asked is a pulse formed. If there is a pulse an alarm is sounded at 109.

If the integers are equal a positive signal is generated at the input of the AND gate at 110 to actuate the computer control indicated at 111.

Figure 6:
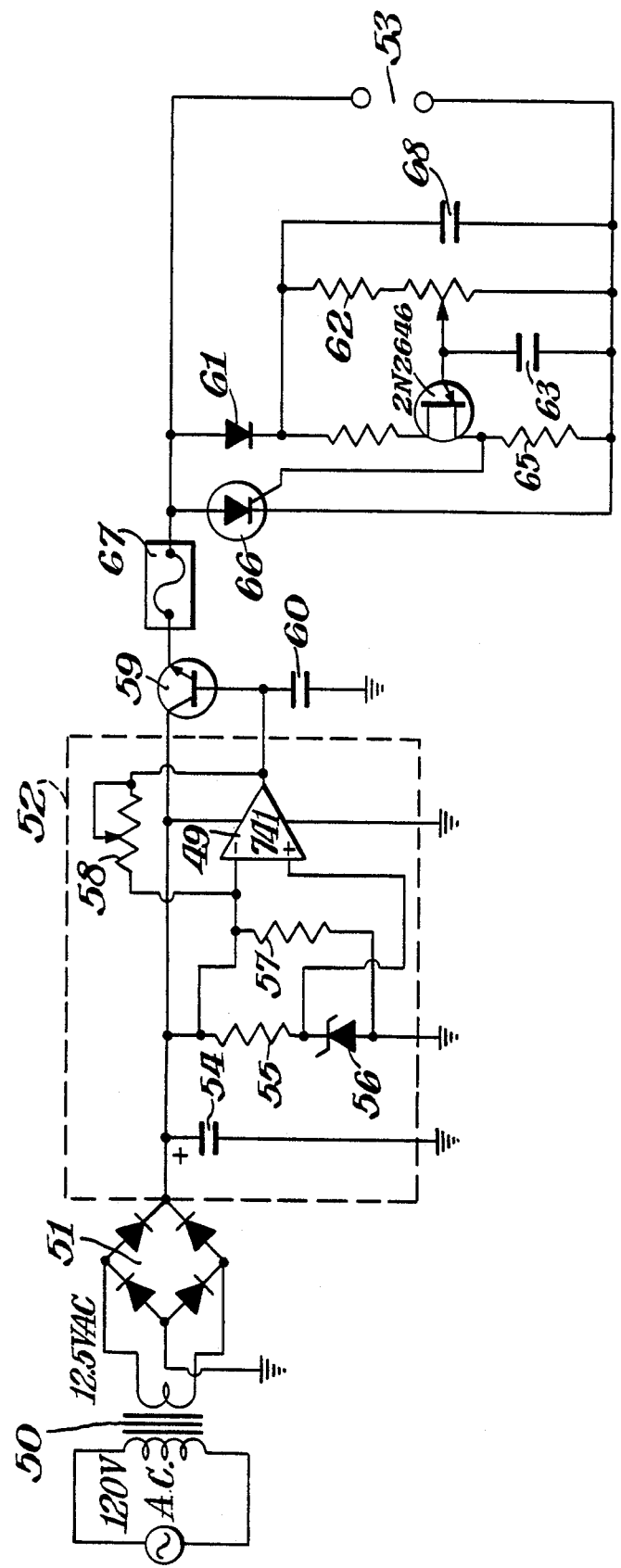
FIG. 6 is a schematic of a power supply.

A power supply shown in FIG. 6, is composed essentially of a step-down transformer 50, a full-wave bridge rectifier 41, and network 42 and an output 53.

The step-down transformer 50 supplies 12.5 volts of alternating current to the rectifier 51. An effective voltage of approximately 17.5 volts is applied to the positive plate of capacitor 54 in the network 52. The capacitor 54 functions as a high pass filter removing the low frequency component of the alternating voltage. This creates a direct current and voltage which is in parallel with a series limiting resistor 55 and zener diode 56. The diode 56 and resistor 55 are connected to the input of operational amplifier 49 and feedback provided by resistor 57 and 58. Resistor 58 is variable. The voltage is supplied from network 52 through transistor 59. The voltage can be accurately determined by adjusting resistor 58. The adjustment of resistor 58 by clamping a capacitor 60 on the base of transistor 59 at a level such that the voltage between the emitter of transistor 59 and ground is set to the required level. The output from transistor 59 is transferred to the output 53 through a crowbar circuit.

The crowbar circuit operates when the voltage and current exceed the prescribed level. Fed through diode 61 and a resistor network 62, a capacitor 63 begins to charge. If capacitor 63 is charged to a required level thus unijunction 64 discharges capacitor 63 through resistor 65 which triggers gate of the SCR 66. The positive gate voltage of SCR 66 causes fuse 67 to blow.

Capacitor 68 functions to an additional delay for the tirp point.

The apparatus contains circuit means for preventing failure of or vitiating the operation of the apparatus.

Referring to FIG. 4B the power cable from the protective apparatus to the electronic or electric device is protected from being cut by a circuit 70. This circuit 70 uses NAND gates. Two of the NAND gates 71 are configured as inverters. Two of the NAND gates 72 function as an R-S latch. A wire running through the power cord is illustrated in FIG. 4B as connected to pins 73 and 74 of the NAND gate 71 and terminating at ground. If the power cord is cut and this wire is cut or otherwise open, then a pin 75 of the AND gate 72 goes positive and provides base current to the transistor 76 of the circuit 70. This in turn gives base current to transistor 77 which in turn conducts to activate the alarm 29.

The apparatus once activated cannot be unplugged or have the power disconnected without the alarm 29 being activated This is provided by the circuit of alarm 29 illustrated in FIG. 4B. Five volts is applied to the base of the transistor 79 in the alarm circuit. This places transistor 80 into conduction and in turn connects the anode of diode 80 to ground. If the apparatus is unplugged or power is otherwise removed from transistor 79, the voltage of the battery 82 is placed on the anode of diode 81 and this in turn causes the SCR 83 to conduct. The on state of the diode 81 in turn provides the current which activates a buzzer alarm 84.

Another protection against unauthorized activity is provided by the connector means of the control board 10 and the protective apparatus 12. In FIG. 4B, a receptacle 85 is provided for the connection of the power consuming device, represented in FIG. 1 by control board 10, to the verifying apparatus, represented in FIG. 1 by the protective apparatus. This receptacle 85 contains an electro-mechanical switch 86 shown in FIG. 4B in a line connection between the positive side of battery 87 and the buzzer alarm 84. When switch 86 closes the buzzer 84 is sounded.

In operation, the receptacle 85 receives a plug 90, shown in FIG. 4B which holds switch 86 open. If and when the device as represented by control board 10 is separated from the verifying apparatus and plug 90 is removed from receptacle 85, switch 86 closes and the alarm 84 announces the disconnection.

ADVANTAGES

In addition to the advantages of the present invention described above, this system features redundancy in protection against misappropriation. For example, the verified command which leads to the actuating signal works through a magnetic field which is activated by a light beam. One of the results of this means is that the protective apparatus 12 is transparent to the control board 10.

When an authorized user enters the correct code, this is verified and the actuating signal is produced. If an error is made or an incorrect code entered, the audible alarm is activated. For an alarm to be terminated, an authorized individual must have access to a locked unit to reset the contained apparatus.

It will be understood that the apparatus described above can be modified with the spirit of the invention. For example, the design can be expanded to involve 10 digits in the coded information. This increases the odds against accidental discovery of the correct code to 1 in 1,000,000,000.

Also it will be understood that the comparison step can be affected by the programming of tn EPROM within the purpose and object of this invention.

It is a feature of this invention that the delay introduced in generating the signal indicating an incorrect input provides time to record a phone number or for initiating a trace activity.

I claim:

1. A method for processing a set of code characters in an authentication of the code for authorization of a user or actuation of a device by a user
comprising the steps of
introducing a first character of a code set in a first time cycle,
converting the character to a BCD, consisting of ones and zeros,
transmitting the BCD to a decoder and producing a charge on a first output terminal,
during said first time cycle transmitting a pulse to a first terminal of a counter circuit capable of scanning increment charges from terminal to terminal of said counter,
transmitting pulses from the counter to a plurality of inhibiting control circuits each of which contains a bistable circuit having an on state capable of transmitting a positive pulse received at a first input so as to produce an output pulse and an off state incapable of transmitting a positive pulse received at said first input and
having a second input capable of receiving a signal switching said bistable circuit to the on state from the off state,
so as to switch that inhibiting control circuits to which a pulse from the counter is transmitted to an off state incapable of switching to produce output pulse
or to an on state capable of switching to produce said output pulse
and issuing a signal from one of said inhibiting control circuits in an on-stage by switching the bistable circuit indicative of whether an unauthentic character is present in the time cycle,
subsequently in the first time cycle transmitting a pulse from said first output terminal on the decoder to one of said inhibiting control circuits,
and repeating at least once the steps of introducing a character of the code set in a time cycle, converting the character to a BCD, transmitting the BCD to a decoder and producing an output pulse and subsequently in the time cycle transmitting the output pulse to the inhibiting control circuits.

2. In the method as claimed in claim 1 entering a first code character at a keyboard,
then entering a pulse in a delay circuit in entering said first code character,
on converting the character to a BCD transmitting the BCD to a first memory,
then entering a second code character at the keyboard and on converting the second character to a BCD transmitting the BCD to the first memory and shifting the first BCD to a second memory,
and transmitting the BCD's in the first and second memories to an EXCLUSIVE OR gate
to determine whether the BCD in the first memory is the equivalent of the BCD in the second .memory by the issuance of a pulse from the EXCLUSIVE OR gate.

3. A method of authenticating a set of code characters to establish authority for user access and for disabling on receiving unauthentic character
comprising the steps of initiating setting a first inhibiting control circuit in an off-state of non-transmittal of an applied pulse and a plurality of additional inhibiting control circuits in an on-state of transmittal of an applied pulse,
said inhibiting control circuits in an on-state being switchable to issue a disabling pulse,
entering a first code character by suitable input means in a first cycle,
converting the entered code character to a binary coded decimal,
transferring the binary coded decimal to a decoder to change the state of a terminal so as to converting the binary coded decimal to a pulse on a preselected output of the decoder
transferring the output pulse form the first character form the decoder to one of said inhibiting control circuits said pulse being capable of producing a condition indicative of an unauthentic character present in the cycle in an on-state inhibiting control circuit, and during the first cycle initiating an additional one of said inhibiting control circuits in an off-state of non-transmittal of an applied pulse and additional of said inhibiting control circuits in an on-state, subsequently at least once repeating the steps of entering a character in a cycle converting, transferring, decoding an output pulse and transferring the output pulse to one of said inhibiting control circuits.

4. A method for detecting an unauthentic character in the processing of a set of code integers in a cyclic operation in an authenntication of the code made up of characters in a preselected sequence so as to establish the authority for access of a user, comprising introducing a sequence of characters in timed cycles of a cyclic operation consisting of each code character introduction taking place in one of a sequence of timed cycles, converting each character to a BCD consisting of a series of zeros and ones and decoding each BCD to a state of charge on a selected terminal position of means for decoding the BCD transmitting the state of the charge from the terminal to one of a plurality inhibiting control circuits which contain a bistable circuit having an on state capable of transmitting a positive pulse received at a first input so as to produce an output pulse and off state incapable of transmitting a positive pulse received at said first input and having a second input capable of receiving a signal switching said bistable circuit to the on state from the off state, and issuing a signal from said inhibiting control circuits by switching of the bistable circuit to change the state of charge at output, said change in output being indicative of whether an unauthentic character is present in a time cycle.

5. An authentication arrangement for establishing the authority for access of a user comprising:

means for entering binary coded decimals consisting of a series of ones and zeros into a decoder and translating the binary coded decimals into selected output pulses from the decoder a plurality of inhibiting control circuits switchable to an on-state capable of conducting a pulse and a non-conducting off-state means for switching one of said inhibiting control circuits to an off-state and switching the remainder of the inhibiting control circuits to an on-state, and means for transmitting a selected output pulse from the decoder to one of said plurality of inhibiting control circuits whereby transmitting a select pulse to one of said plurality of inhibiting control circuits in the on-state produce a disabling a select pulse to an inhibiting control circuit in the off-state inhibits transmission of the pulse from the control circuit, and means having cyclic operation for introducing characters into the arrangement and converting the characters to said binary coded decimals and causing the selected output pulses to the control circuits to determine the authenticity of the introduced characters.

* * * * *